(12) United States Patent
la O' et al.

(10) Patent No.: US 8,137,831 B1
(45) Date of Patent: Mar. 20, 2012

(54) ELECTROLYTE FLOW CONFIGURATION FOR A METAL-HALOGEN FLOW BATTERY

(75) Inventors: Gerardo Jose la O', Alameda, CA (US); Rick Winter, Orinda, CA (US); Jonathan L. Hall, San Mateo, CA (US); Pallavi Pharkya, Fremont, CA (US)

(73) Assignee: Primus Power Corporation, Hayward, CA (US)

( * ) Notice: Subject to any disclaimer, the term of this patent is extended or adjusted under 35 U.S.C. 154(b) by 0 days.

(21) Appl. No.: 13/169,487

(22) Filed: Jun. 27, 2011

(51) Int. Cl.
*H01M 2/38* (2006.01)
(52) U.S. Cl. ............................................ 429/51; 429/72
(58) Field of Classification Search .................... 429/51
See application file for complete search history.

(56) References Cited

U.S. PATENT DOCUMENTS

| | | |
|---|---|---|
| 3,644,190 A | 2/1972 | Weist et al. |
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |

(Continued)

FOREIGN PATENT DOCUMENTS

JP   63-314782 A   12/1988

(Continued)

OTHER PUBLICATIONS

Symons, Philip C., "Advanced Technology Zinc/Chlorine Batteries for Electric Utility Load Leveling," 19th Intersociety Energy Conversion Engineering Conf., 1984, vol. 2, 857-862.

(Continued)

*Primary Examiner* — Patrick Ryan
*Assistant Examiner* — Brent Thomas
(74) *Attorney, Agent, or Firm* — The Marbury Law Group PLLC

(57) ABSTRACT

A flow battery and method of operating a flow battery. The flow battery includes a first electrode, a second electrode and a reaction zone located between the first electrode and the second electrode. The flow battery is configured with a first electrolyte flow configuration in charge mode and a second flow configuration in discharge mode. The first electrolyte flow configuration is at least partially different from the second electrolyte flow configuration.

15 Claims, 14 Drawing Sheets

U.S. PATENT DOCUMENTS

| | | | |
|---|---|---|---|
| 4,306,003 A | | 12/1981 | Henriksen |
| 4,307,159 A | | 12/1981 | Hammond et al. |
| 4,320,179 A | | 3/1982 | Hart |
| 4,371,825 A | | 2/1983 | Chi et al. |
| 4,413,042 A | | 11/1983 | Carr |
| 4,414,292 A | | 11/1983 | Kiwalle et al. |
| 4,415,847 A | | 11/1983 | Galloway |
| 4,518,663 A | | 5/1985 | Kodali et al. |
| 4,518,664 A | | 5/1985 | Whittlesey et al. |
| 4,534,833 A | | 8/1985 | Carr et al. |
| 4,567,120 A | | 1/1986 | Jorne et al. |
| 4,678,656 A | | 7/1987 | Bjorkman, Jr. et al. |
| 4,728,587 A | | 3/1988 | Horie et al. |
| 4,746,585 A | | 5/1988 | Stoner et al. |
| 4,766,045 A | * | 8/1988 | Bellows et al. ............... 429/105 |
| 2004/0234843 A1 | | 11/2004 | Skyllas-Kazacos |
| 2005/0181273 A1 | | 8/2005 | Deguchi et al. |
| 2005/0244707 A1 | | 11/2005 | Skyllas-Kazacos |
| 2009/0239131 A1 | | 9/2009 | Winter |
| 2010/0021805 A1 | * | 1/2010 | Winter .......................... 429/101 |
| 2011/0070468 A9 | | 3/2011 | Winter |

FOREIGN PATENT DOCUMENTS

| | | |
|---|---|---|
| JP | 02-010671 A | 1/1990 |
| WO | WO 2008/089205 A2 | 7/2008 |
| WO | WO 2011/011533 A3 | 1/2011 |

OTHER PUBLICATIONS

EPRI Report, EM-1051 (parts 1-3), Apr. 1979, Electric Power Research Institute.

U.S. Appl. No. 12/877,852, filed Sep. 8, 2010, Kell et al.

U.S. Appl. No. 12/877,884, filed Sep. 8, 2010, Winter et al.

* cited by examiner

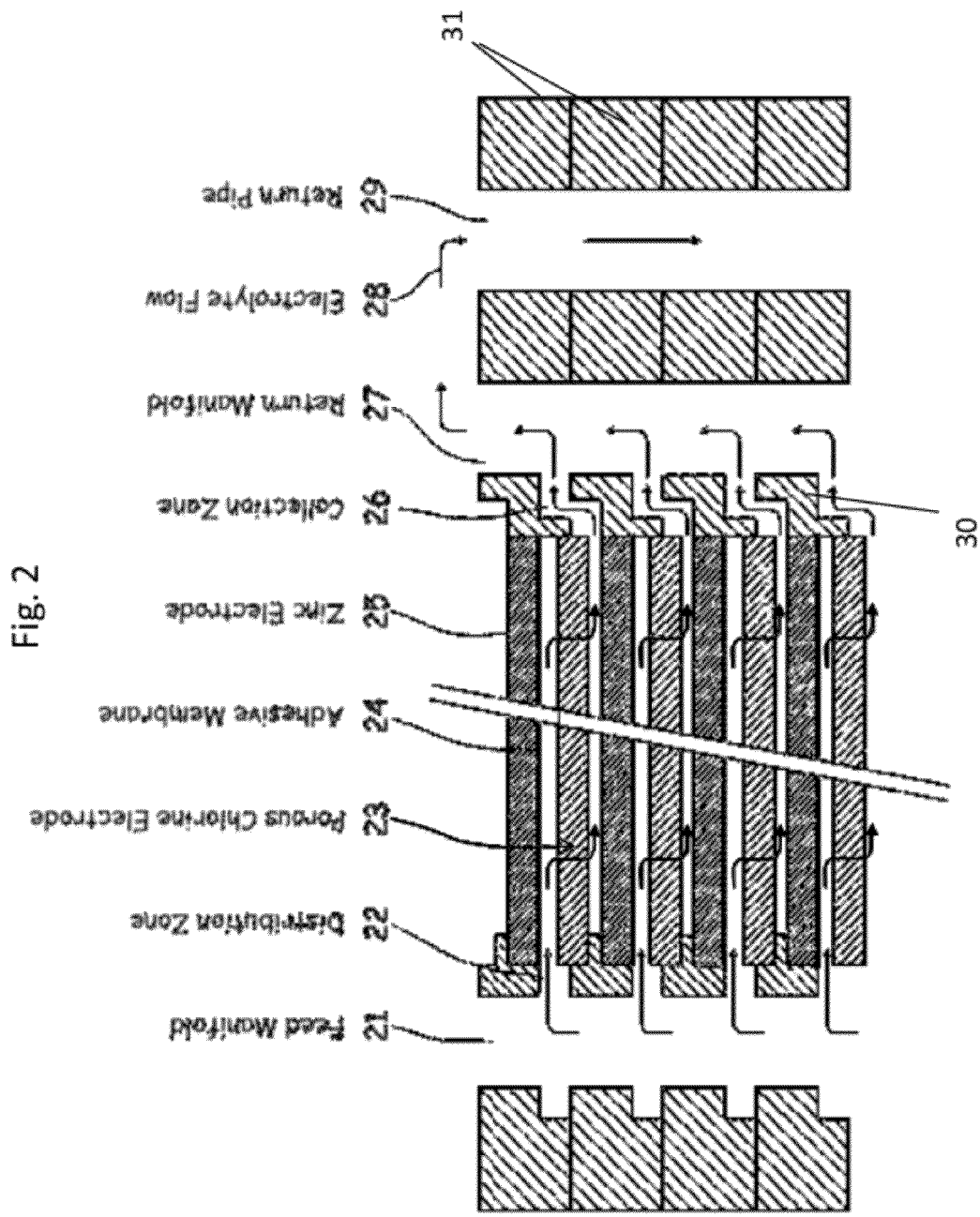

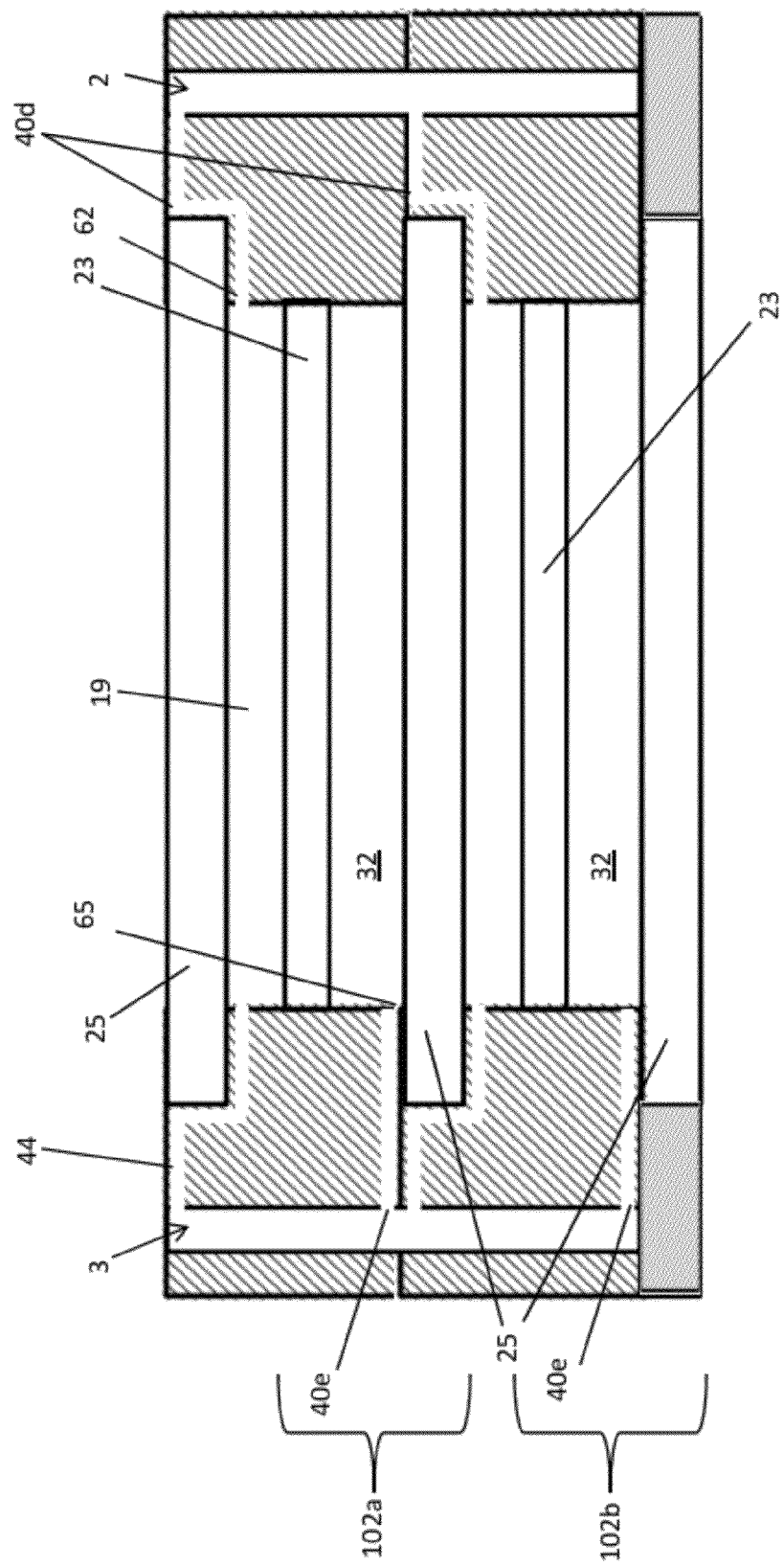

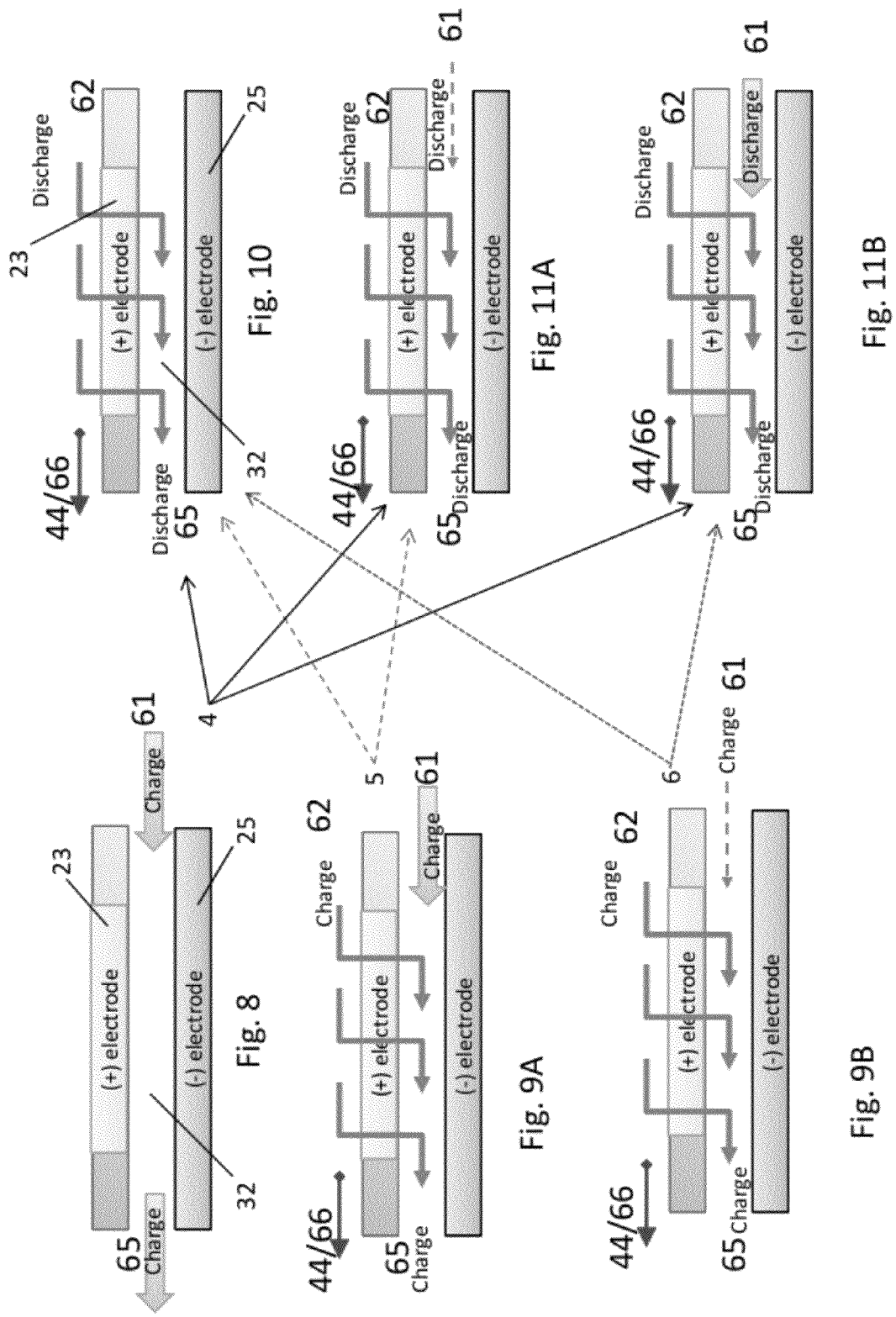

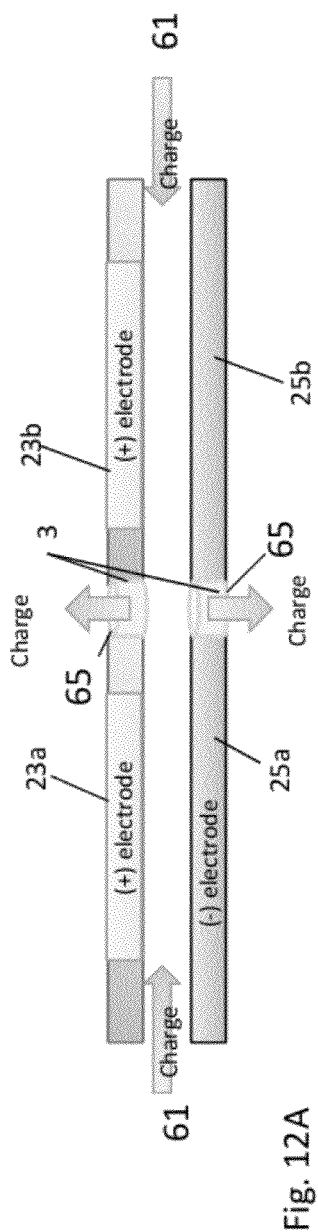
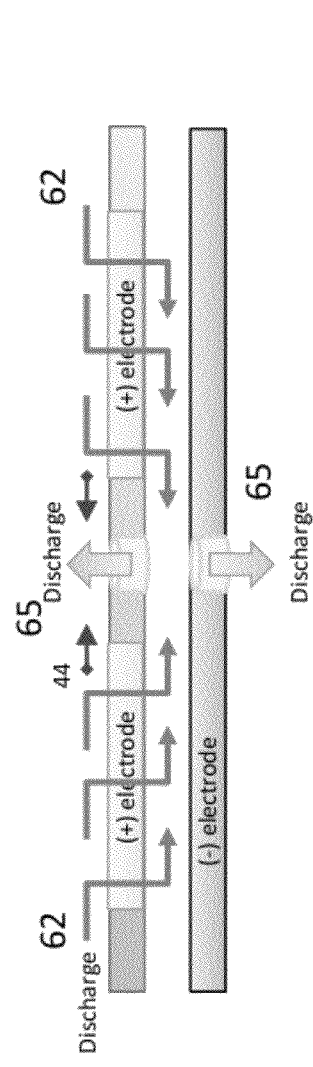
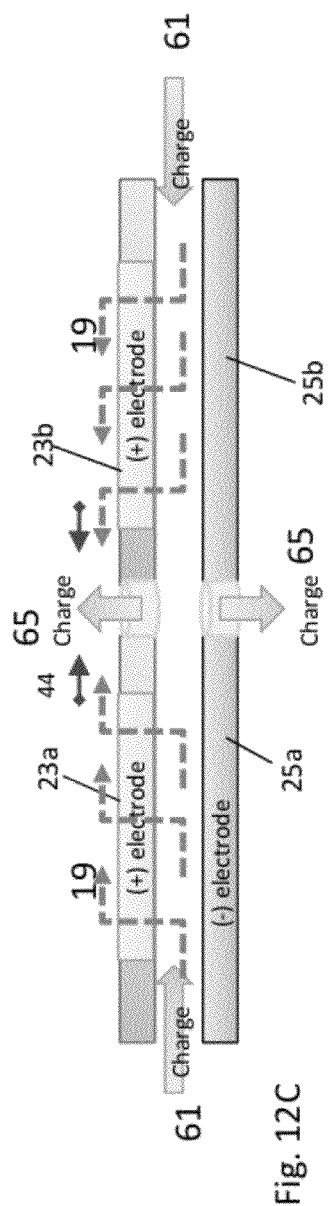
Fig. 12A
Fig. 12B
Fig. 12C

US 8,137,831 B1

ELECTROLYTE FLOW CONFIGURATION FOR A METAL-HALOGEN FLOW BATTERY

FIELD

The present invention is directed to electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-1051 (Parts 1-3) dated April 1979, published by the Electric Power Research Institute, the disclosures of which are hereby incorporated by reference in their entirety.

SUMMARY

An embodiment relates to a flow battery. The flow battery includes a first electrode, a second electrode and a reaction zone located between the first electrode and the second electrode. The flow battery is configured with a first electrolyte flow configuration in charge mode and a second flow configuration in discharge mode. The first electrolyte flow configuration is at least partially different from the second electrolyte flow configuration.

Another embodiment relates to a method of operating a flow battery. The method includes flowing an electrolyte in a first flow configuration in charge mode and a second flow configuration in discharge mode. The first flow configuration is at least partially different from the second flow configuration.

BRIEF DESCRIPTION OF THE DRAWINGS

FIG. 2 illustrates a side cross section view of flow paths in a stack of horizontally positioned cells.

FIG. 7 is a cross section of a stack of electrochemical cells through the line C'-C' in FIG. 3B.

FIG. 8 illustrates a side cross section of an embodiment of an electrolyte flow configuration during charge mode. The electrolyte flow is configured for 100% flow-by flow.

FIG. 9A illustrates a side cross section of another embodiment of an electrolyte flow configuration during charge mode. The electrolyte flow is configured for majority flow-by flow and minority flow-through flow.

FIG. 9B illustrates a side cross section of another embodiment of an electrolyte flow configuration during charge mode. The electrolyte flow is configured for minority flow-by flow and majority flow-through flow.

FIG. 10 illustrates a side cross section of an embodiment of an electrolyte flow configuration during discharge mode. The electrolyte flow is configured for 100% flow-through flow.

FIG. 11A illustrates a side cross section of an embodiment of an electrolyte flow configuration during discharge mode. The electrolyte flow is configured for majority flow-through flow and minority flow-by flow.

FIG. 11B illustrates a side cross section of another embodiment of an electrolyte flow configuration during discharge mode. The electrolyte flow is configured for majority flow-by flow and minority flow-through flow.

FIG. 12A illustrates a side cross section of an embodiment of an electrolyte flow configuration with segmented electrodes in charge mode with 100% flow-by flow.

FIG. 12B illustrates a side cross section of an embodiment of an electrolyte flow configuration with segmented electrodes in discharge mode with 100% flow-through flow.

FIG. 12C illustrates a side cross section of an embodiment of an electrolyte flow configuration with segmented electrodes in charge mode with flow-by and flow-through flow and partial exit flow through a bypass.

DETAILED DESCRIPTION

Figure 1:
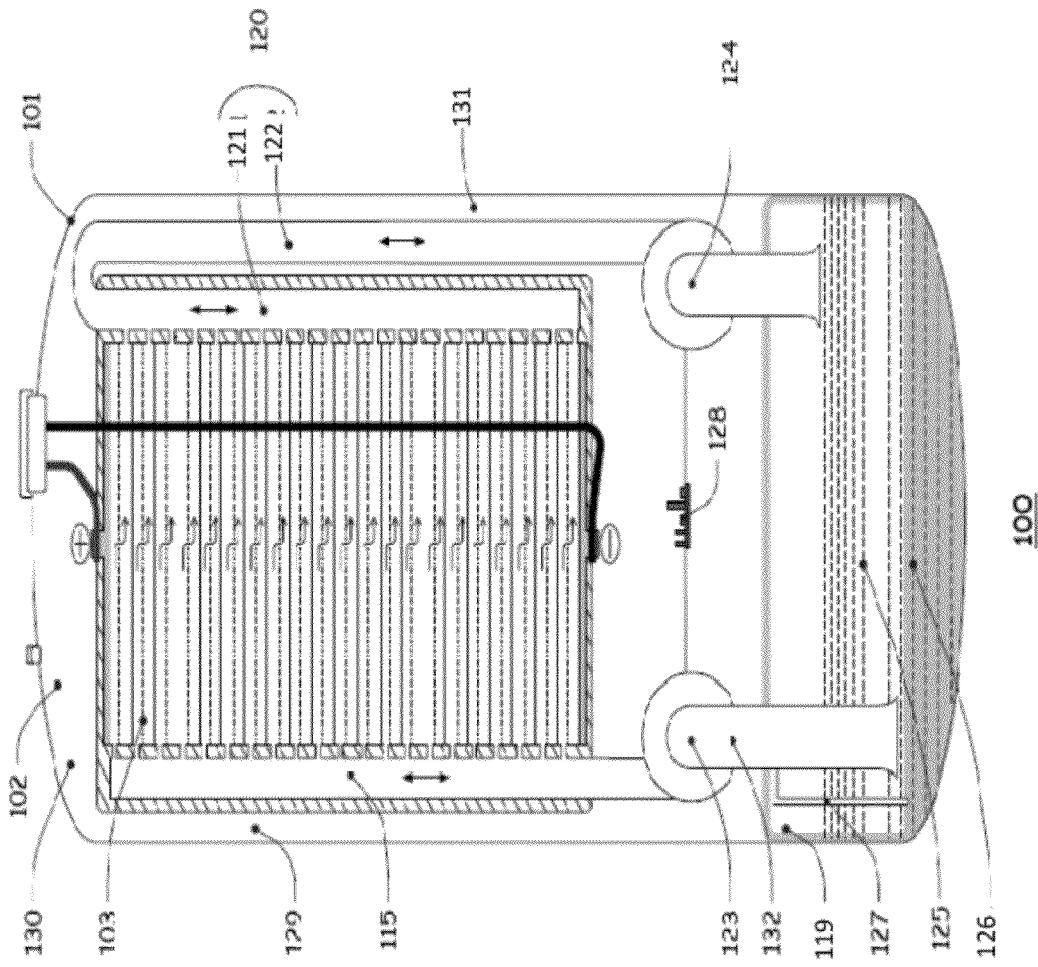
FIG. 1 illustrates a side cross section view of an embodiment of the electrochemical system with a sealed container containing a stack of electrochemical cells.

Embodiments of the present invention are drawn to methods and flow batteries that improve/optimize the electrolyte pathway configuration in a metal-halogen flow battery. The improved electrolyte pathway configuration improves the metal plating morphology, reduces the corrosion rate on the metal, and increases the voltaic efficiency. The improved electrolyte pathway configuration also improves the coulombic efficiency of the entire battery system.

The following documents, the disclosures of which are incorporated herein by reference in their entirety for a teaching of flow battery systems, can be useful for understanding and practicing the embodiments described herein: U.S. patent application Ser. No. 12/523,146, which is a U.S. National Phase entry of PCT application no. PCT/US2008/051111 filed Jan. 11, 2008, which claims benefit of priority to U.S. patent application Ser. No. 11/654,380 filed Jan. 16, 2007.

The embodiments disclosed herein relate to an electrochemical system (also sometimes referred to as a "flow battery"). The electrochemical system can utilize a metal-halide electrolyte and a halogen reactant, such as molecular chlorine. The halide in the metal-halide electrolyte and the halogen reactant can be of the same type. For example, when the halogen reactant is molecular chlorine, the metal halide electrolyte can contain at least one metal chloride.

The electrochemical system can include a sealed vessel containing an electrochemical cell in its inner volume, a metal-halide electrolyte and a halogen reactant, and a flow circuit configured to deliver the metal-halide electrolyte and the halogen reactant to the electrochemical cell. The sealed vessel can be a pressure vessel that contains the electrochemical cell. The halogen reactant can be, for example, a molecular chlorine reactant.

In many embodiments, the halogen reactant may be used in a liquefied form. The sealed vessel is such that it can maintain an inside pressure above a liquefaction pressure for the halogen reactant at a given ambient temperature. A liquefaction pressure for a particular halogen reactant for a given temperature may be determined from a phase diagram for the halogen reactant. The system that utilizes the liquefied halogen reactant in the sealed container does not require a compressor, while compressors are often used in other electrochemical systems for compression of gaseous halogen reactants. The system that utilizes the liquefied halogen reactant does not require a separate storage for the halogen reactant, which can be located outside the inner volume of the sealed vessel. The term "liquefied halogen reactant" refers to at least one of molecular halogen dissolved in water, which is also known as wet halogen or aqueous halogen, and "dry" liquid molecular halogen, which is not dissolved in water. Similarly, the term "liquefied chlorine" may refer to at least one of molecular chlorine dissolved in water, which is also known as wet chlorine or aqueous chlorine, and "dry" liquid chlorine, which is not dissolved in water.

In many embodiments, the system utilizes liquefied molecular chlorine as a halogen reactant. The liquefied molecular chlorine has a density which is approximately one and a half times greater than that of water.

The flow circuit contained in the sealed container may be a closed loop circuit that is configured to deliver the halogen reactant, preferably in the liquefied or liquid state, and the at least one electrolyte to and from the cell(s). In many embodiments, the loop circuit may be a sealed loop circuit. Although the components, such as the halogen reactant and the metal halide electrolyte, circulated through the closed loop are preferably in a liquefied state, the closed loop may contain therein some amount of gas, such as chlorine gas.

Preferably, the loop circuit is such that the metal halide electrolyte and the halogen reactant circulate through the same flow path without a separation in the cell(s).

Each of the electrochemical cell(s) may comprise a first electrode, which may serve as a positive electrode in a normal discharge mode, and a second electrode, which may serve as a negative electrode in a normal discharge mode, and a reaction zone between the electrodes.

In many embodiments, the reaction zone may be such that no separation of the halogen reactant, such as the halogen reactant or ionized halogen reactant dissolved in water of the electrolyte solution, occurs in the reaction zone. For example, when the halogen reactant is a liquefied chlorine reactant, the reaction zone can be such that no separation of the chlorine reactant, such as the chlorine reactant or chlorine ions dissolved in water of the electrolyte solution, occurs in the reaction zone. The reaction zone may be such that it does not contain a membrane or a separator between the positive and negative electrodes of the same cell that is impermeable to the halogen reactant, such as the halogen reactant or ionized halogen reactant dissolved in water of the electrolyte solution. For example, the reaction zone may be such that it does not contain a membrane or a separator between the positive and negative electrodes of the same cell that is impermeable to the liquefied chlorine reactant, such as the chlorine reactant or chlorine ions dissolved in water of the electrolyte solution.

In many embodiments, the reaction zone may be such that no separation of halogen ions, such as halogen ions formed by oxidizing the halogen reactant at one of the electrodes, from the rest of the flow occurs in the reaction zone. In other words, the reaction zone may be such that it does not contain a membrane or a separator between the positive and negative electrodes of the same cell that is impermeable for the halogen ions, such as chlorine ions. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane.

In certain embodiments, the first electrode may be a porous electrode or contain at least one porous element. For example, the first electrode may comprise a porous or a permeable carbon, metal or metal oxide electrode. For example, the first electrode may comprise porous carbon foam, a metal mesh or a porous mixed metal oxide coated electrode, such as a porous titanium electrode coated with ruthenium oxide (i.e., ruthenized titanium). In a discharge and charge modes, the first electrode may serve as a positive electrode, at which the halogen may be reduced into halogen ions. The use of the porous material in the first electrode may increase efficiency of the halogen reactant's reduction and hence the voltaic efficiency of the battery.

In many embodiments, the second electrode may comprise a primary depositable and oxidizable metal, i.e., a metal that may be oxidized to form cations during the discharge mode. In many embodiments, the second electrode may comprise a metal that is of the same type as a metal ion in one of the components of the metal halide electrolyte. For example, when the metal halide electrolyte comprises zinc halide, such as zinc chloride, the second electrode may comprise metallic zinc. Alternatively, the electrode may comprise another material, such as titanium that is plated with zinc. In such a case, the electrochemical system may function as a reversible system.

Thus, in some embodiments, the electrochemical system may be reversible, i.e. capable of working in both charge and discharge operation mode; or non-reversible, i.e. capable of working only in a discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. On the other hand, the non-reversible electrochemical system does not utilize the metal halides that satisfy the above requirements. Metals of metal halides that are used in the non-reversible systems are usually unstable and strong in their reduced, elemental form to be able to form an electrode. Examples of such unstable metals and their corresponding metal halides include potassium (K) and potassium halides and sodium (Na) and sodium halides.

The metal halide electrolyte can be an aqueous electrolytic solution. The electrolyte may be an aqueous solution of at least one metal halide electrolyte compound, such as $ZnCl_2$. For example, the solution may be a 15-50% aqueous solution of $ZnCl_2$, such as a 25% solution of $ZnCl_2$. In certain embodiments, the electrolyte may contain one or more additives, which can enhance the electrical conductivity of the electrolytic solution. For example, when the electrolyte contains $ZnCl_2$, such additive can be one or more salts of sodium or potassium, such as NaCl or KCl.

FIG. 1 illustrates an electrochemical system 100 which includes at least one electrochemical cell, an electrolyte and a halogen reactant contained in a sealed container 101. The sealed container 101 is preferably a pressure containment vessel, which is configured to maintain a pressure above one atmospheric pressure in its inner volume 102. Preferably, the sealed container 101 is configured to maintain a pressure in its inner volume above the liquefaction pressure for the halogen reactant, such as elemental chlorine. For functioning at a normal temperature such as 10-40° C., the sealed container may be configured to maintain an inside pressure of at least 75 psi or of at least 100 psi or of at least 125 psi or of at least 150 psi or of at least 175 psi or of at least 200 psi or of at least 250 psi or of at least 300 psi or of at least 350 psi or of at least 400 psi or of at least 450 psi or of at least 500 psi or of at least 550 psi or of at least 600 psi, such as 75-650 psi or 75-400 psi and all subranges described previously. The walls of the sealed container may be composed of a structural material capable to withstand the required pressure. One non-limiting example of such a material is stainless steel.

The at least one electrochemical cell contained inside the sealed container 101 is preferably a horizontally positioned cell, which may include a horizontal positive electrode and horizontal negative electrode separated by a gap. The horizontally positioned cell may be advantageous because when the circulation of the liquid stops due to, for example, turning off a discharge or a charge pump, some amount of liquid (the electrolyte and/or the halogen reactant) may remain in the reaction zone of the cell. The amount of the liquid may be such that it provides electrical contact between the positive and negative electrodes of the same cell. The presence of the liquid in the reaction zone may allow a faster restart of the electrochemical system when the circulation of the metal halide electrolyte and the halogen reagent is restored compared to systems that utilize a vertically positioned cell(s), while providing for shunt interruption. The presence of the electrolyte in the reaction zone may allow for the cell to hold a charge in the absence of the circulation and thus, ensure that the system provides uninterrupted power supply (UPS). The horizontally positioned cell(s) in a combination with a liquefied chlorine reactant used as a halogen reactant may also prevent or reduce a formation of chlorine bubbles during the operation.

In many embodiments, the sealed container may contain more than one electrochemical cell. In certain embodiments, the sealed container may contain a plurality of electrochemical cells, which may be connected in series. In some embodiments, the plurality of electrochemical cells that are connected in series may be arranged in a stack. For example, element 103 in FIG. 1 represents a vertical stack of horizontally positioned electrochemical cells, which are connected in series. The stack of horizontally positioned cells may be similar to the one disclosed on pages 7-11 and FIGS. 1-3 of WO2008/089205, which is incorporated herein by reference in its entirety. The advantages of a single horizontally positioned cell apply to the stack as well.

The electrochemical system can include a feed pipe or manifold that may be configured in a normal discharge operation mode to deliver a mixture comprising the metal-halide electrolyte and the liquefied halogen reactant to the at least one cell. The electrochemical system may also include a return pipe or manifold that may be configured in the discharge mode to collect products of an electrochemical reaction from the at least one electrochemical cell. Such products may be a mixture comprising the metal-halide electrolyte and/or the liquefied halogen reactant, although the concentration of the halogen reactant in the mixture may be reduced compared to the mixture entering the cell due to the consumption of the halogen reactant in the discharge mode.

For example, in FIG. 1 a feed pipe or manifold 115 is configured to deliver a mixture comprising the metal-halide electrolyte and the liquefied halogen reactant to the horizontally positioned cells of the stack 103. A return pipe or manifold 120 is configured to collect products of an electrochemical reaction from cells of the stack. As will be further discussed, in some embodiments, the feed pipe or manifold and/or the return pipe or manifold may be a part of a stack assembly for the stack of the horizontally positioned cells. In some embodiments, the stack 103 may be supported directly by walls of the vessel 101. Yet in some embodiments, the stack 103 may be supported by one or more pipes, pillars or strings connected to walls of the vessel 101 and/or reservoir 119.

The feed pipe or manifold and the return pipe or manifold may be connected to a reservoir 119 that may contain the liquefied, e.g. liquid, halogen reactant and/or the metal halide reactant. Such a reservoir may be located within the sealed container 101. The reservoir, the feed pipe or manifold, the return pipe or manifold and the at least one cell may form a loop circuit for circulating the metal-halide electrolyte and the liquefied halogen reactant.

The metal-halide electrolyte and the liquefied halogen reactant may flow through the loop circuit in opposite directions in charge and discharge modes. In the discharge mode, the feed pipe or manifold 115 may be used for delivering the metal-halide electrolyte and the liquefied halogen reactant to the at least one cell 103 from the reservoir 119 and the return pipe or manifold 120 for delivering the metal-halide electrolyte and the liquefied halogen reactant from the at least one cell back to the reservoir. In the charge mode, the return pipe or manifold 120 may be used for delivering the metal-halide electrolyte and/or the liquefied halogen reactant to the at least one cell 103 from the reservoir 119 and the feed pipe or manifold 115 for delivering the metal-halide electrolyte and/or the liquefied halogen reactant from the at least one cell 103 back to the reservoir 119.

In some embodiments, when the system utilizes a vertical stack of horizontally positioned cells, the return pipe or manifold 120 may be an upward-flowing return pipe or manifold. The pipe 120 includes an upward running section 121 and a downward running section 122. The flow of the metal-halide electrolyte and the liquefied halogen electrolyte leaves the cells of the stack 103 in the discharge mode upward through the section 121 and then goes downward to the reservoir through the section 122. The upward flowing return pipe or manifold may prevent the flow from going mostly through the bottom cell of the stack 103, thereby, providing a more uniform flow path resistance between the cells of the stack.

The electrochemical system may include one or more pumps for pumping the metal-halide electrolyte and the liquefied halogen reactant. Such a pump may or may not be located within the inner volume of the sealed vessel. For example, FIG. 1 shows discharge pump 123, which fluidly connects the reservoir 119 and the feed pipe or manifold 115 and which is configured to deliver the metal-halide electrolyte and the liquefied halogen reactant through the feed pipe or manifold 115 to the electrochemical cell(s) 103 in the discharge mode. In some embodiments, the electrochemical system may include charge pump depicted as element 124 in FIG. 1. The charge pump fluidly connects the return pipe or manifold 120 to the reservoir 119 and can be used to deliver the metal-halide electrolyte and the liquefied halogen reactant through the return pipe or manifold to the electrochemical cell(s) in the charge mode. In some embodiments, the electrochemical system may include both charge and discharge pumps. The charge and discharge pumps may be configured to pump the metal-halide electrolyte and the liquefied halogen reactant in the opposite directions through the loop circuit that includes the feed pipe or manifold and the return pump or manifold. Preferably, the charge and discharge pumps are configured in such a way so that only one pump operates at a given time. Such an arrangement may improve the reliability of the system and increase the lifetime of the system. The opposite pump arrangement may also allow one not to use in the system a valve for switching between the charge and discharge modes. Such a switch valve may often cost more than an additional pump. Thus, the opposite pump arrangement may reduce the overall cost of the system.

Pumps that are used in the system may be centripetal pumps. In some embodiments, it may be preferred to use a pump that is capable to provide a pumping rate of at least 30 L/min.

FIG. 1 depicts the reservoir as element 119. The reservoir 119 may be made of a material that is inert to the halogen reactant. One non-limiting example of such an inert material may be a polymer material, such as polyvinyl chloride (PVC). The reservoir 119 may also store the metal halide electrolyte. In such a case, if the liquefied chlorine is used as a liquefied halogen reactant, then the chlorine can be separated from the metal halide electrolyte due to a higher density (specific gravity) of the former, and/or by a separation device as described in copending U.S. Patent Application Ser. No. 61/364,631, the disclosure of which is hereby incorporated by reference in its entirety for a teaching of the separation device. FIG. 1 shows liquefied chlorine at the lower part of the reservoir (element 126) and the metal-halide electrolyte being above the liquefied chlorine in the reservoir (element 125).

The reservoir 119 may contain a feed line for the liquefied halogen reactant, which may supply the halogen reactant to the feed pipe or manifold 115 of the system. A connection between the halogen reactant feed line and the feed manifold of the system may occur before, at or after a discharge pump 123. In some embodiments, the connection between the halogen reactant feed line and the feed manifold of the system may comprise a mixing venturi. FIG. 1 presents the feed line for the liquefied halogen reactant as element 127. An inlet of the feed line 127, such as a pipe or conduit, may extend to the lower part 126 of the reservoir 119, where the liquefied halogen reactant, such as the liquefied chlorine reactant, may be stored. An outlet of the feed line 127 is connected to an inlet of the discharge pump 123. The electrolyte intake feed line, such as a pipe or conduit 132, may extend to the upper part 125, where the metal-halide electrolyte is located.

As noted above, in some embodiments, the reservoir 119 may include a separation device, such as one or more sump plates, which may be, for example, a horizontal plate with holes in it. The sump plate may facilitate the settling down of the liquefied halogen reactant, such as liquefied chlorine reactant, at the lower part 126 of the reservoir, when the liquefied halogen reactant returns to the reservoir 119, for example, from the return pipe or manifold 120 in the discharge mode. The reservoir 119 is preferably but not necessarily located below the stack of cells 103.

In some embodiments, the reservoir 119 may include one or more baffle plates. Such baffle plates may be vertical plates located at the top and bottom of the reservoir. The baffle plates may reduce and/or prevent eddy currents in the returning flow of the metal-halide electrolyte and the liquefied halogen reactant, thereby enhancing the separation of the liquefied halogen from the metal-halide electrolyte in the reservoir.

In certain embodiments, the discharge pump may be positioned with respect to the reservoir so that its inlet/outlet is located below the upper level of the metal-halide electrolyte in the reservoir. In certain embodiments, the inlet/outlet of the discharge pump may be positioned horizontally or essentially horizontally. In such an arrangement, the flow of the metal-halide electrolyte and the liquefied halogen reactant may make a 90 degree turn in the discharge pump from a horizontal direction in the inlet to a vertical direction in the feed manifold or pipe 115. In some embodiments, the inlet of the discharge pump 123 may include a bellmouth piece, which may slow down the flow and thereby prevent/reduce formation of turbulence in the reservoir.

The charge pump may also be positioned with its inlet/outlet located below the upper level of the metal-halide electrolyte in the reservoir. In certain embodiments, the inlet/outlet of the charge pump may be located at a lower level than the inlet/outlet of the discharge pump. The inlet/outlet of the charge pump may also have a bellmouth piece, which may slow down the flow and thereby prevent/reduce formation of turbulence in the reservoir.

Thus, in summary, the reservoir 119 which has a lower part 126, which may contain the liquefied halogen reactant, such as a liquefied molecular chlorine reactant; an upper part 125, which may contain the metal halide reactant; a horizontal sump plate, vertical baffle plates, a horizontal inlet of a discharge pump, a horizontal outlet of a charge pump and a feed line for the liquefied halogen reactant, which has an inlet in the lower part 126 of the reservoir and which is connected to the discharge pump's inlet. The sump plate is positioned approximately at the level where the boundary between the metal-halide electrolyte and the halogen reactant is expected to be located. Discharge pump's inlet and charge pump's outlet may protrude through the walls of the reservoir.

In some embodiments, the electrochemical system may include a controlling element, which may be used, for example, for controlling a rate of the discharge pump, a rate of the charge pump and/or a rate of feeding the halogen reactant into the electrolyte. Such a controlling element may be an analog circuit. FIG. 1 depicts the controlling element as element 128, which may control one or more of the following parameters: rates of the charge pump 124 and the discharge pump 123 and a feed rate of the liquefied chlorine reactant through the feed line 127.

The inner volume of the sealed container may have several pressurized zones, each having a different pressure. For example, the inner volume may include a first zone, and a second zone having a pressure higher than that of the first zone. In some embodiments, the first zone may be enveloped or surrounded by the second, higher pressure zone. The first zone may contain the electrolyte/liquefied halogen reactant loop, i.e. the reservoir 119, the cell(s) 103, pump(s) 123 and 124, manifold(s) 115, 120, while the second surrounding or enveloping zone may be a space between the first zone and the walls of the sealed vessel 101. In FIG. 1, the cells 103, the feed manifold or pipe 115, the reservoir 119, including the metal halide reactant in the upper part 125 of the reservoir and the liquefied halogen reactant in its lower part 126, and the return manifold or pipe 120 all may be in the first pressure zone, while the higher pressure second zone may be represented by the areas 129, 130 and 131 of the inner volume of the vessel 101.

In such an arrangement, a pressure in the first zone may be a pressure sufficient to liquefy the halogen reactant at a given temperature. Such a pressure may be at least 75 psi or at least 100 psi or at least 125 psi or at least 150 psi or at least 175 psi or at least 200 psi or at least 250 psi or at least 300 psi or at least 350 psi or at least 400 psi, such as 75-450 psi or 75-400 psi and all subranges in between. At the same time, a surrounding pressure in the second pressure zone may be higher than a maximum operating pressure of the first zone. Such a surrounding pressure may be at least 75 psi or at least 100 psi or at least 125 psi or at least 150 psi or at least 175 psi or at least 200 psi or at least 250 psi or at least 300 psi or at least 350 psi or at least 400 psi or at least 450 psi or at least 500 psi or at least 550 psi or at least 600 psi, such as 75-650 psi or 200-650 psi or 400-650 psi and all the subranges in between.

The enveloped arrangement may provide a number of advantages. For example, in the event of a leak from the first zone/loop circuit, the higher pressure in the surrounding second zone may cause the leaking component(s) to flow inwards the first zone, instead of outwards. Also, the surrounding higher pressure zone may reduce/prevent fatigue crack propagation over components of the first zone/loop circuit, including components made of plastic, such as manifolds and walls of reservoir. The pressurized envelope arrangement may also allow using thinner outer wall(s) for the sealed container/vessel, which can, nevertheless, prevent deformation(s) that could negatively impact internal flow geometries for the metal-halide electrolyte and the liquefied halogen reactant. In the absence of the pressurizing second zone, thicker outer wall(s) may be required to prevent such deformation(s) due to an unsupported structure against expansive force of the internal higher pressure.

In certain embodiments, the outer walls of the sealed container/vessel may be formed by a cylindrical component and two circular end plates, one of which may be placed on the top of the cylindrical component and the other on the bottom in order to seal the vessel. The use of the pressurized envelope arrangement for such outer walls allows using thinner end plates, without exposing internal flow geometries for the metal-halide electrolyte and the liquefied halogen reactant compared to the case when the outer walls are exposed to the variable pressure generated during the operation of the system.

The second pressure zone may be filled with an inert gas, such as argon or nitrogen. In some embodiments, the second pressure zone may also contain an additional component that can neutralize a reagent, such as the halogen reactant, that is leaking from the first zone, and/or to heal walls of the first zone/loop circuit. Such an additional material may be, for example, a soda ash. Thus, spaces 129, 130 and 131 may be filled with soda ash.

The electrochemical system in a pressurized envelope arrangement may be fabricated as follows. First, a sealed loop circuit for the metal halide electrolyte and the liquefied halogen reagent may be fabricated. The sealed loop circuit can be such that it is capable to maintain an inner pressure above a liquefaction pressure of the liquefied halogen for a given temperature. The sealed loop circuit may include one or more of the following elements: one or more electrochemical cells, a reservoir for storing the metal-halide electrolyte and the liquefied halogen reactant; a feed manifold or pipe for delivering the metal-halide electrolyte and the liquefied halogen reactant from the reservoir to the one or more cells; a return manifold for delivering the metal-halide electrolyte and the liquefied halogen reactant from the one or more cells back to the reservoir; and one or more pumps. After the loop circuit is fabricated, it may be placed inside a vessel or container, which may be later pressurized to a pressure, which is higher than a maximum operation pressure for a loop circuit, and sealed. The pressurization of the vessel may be performed by pumping in an inert gas, such as argon or nitrogen, and optionally, one or more additional components. When the walls of the vessel are formed by a cylindrical component and two end plates, the sealing procedure may include the end plates at the top and the bottom of the cylindrical component.

FIG. 2 illustrates paths for a flow of the metal-halide electrolyte and the liquefied halogen reactant through the horizontally positioned cells of the stack, such as the stack 103 of FIG. 1, in the discharge mode. The electrolyte flow paths in FIG. 2 are represented by arrows. For each of the cells in the stack, the flow may proceed from a feed pipe or manifold 21 (element 115 in FIG. 1), into a distribution zone 22, through a porous "chlorine" electrode 23, over a metal electrode 25, which may comprise a substrate, which may be, for example, a titanium substrate or a ruthenized titanium substrate, and an oxidizable metal, which may be, for example, zinc, on the substrate, to a collection zone 26, through an upward return manifold 27 (element 121 in FIG. 1), and to a return pipe 29 (element 122 in FIG. 1).

In some embodiments, an element 24 may be placed on a bottom of metal electrode 25. Yet in some other embodiments, such an element may be omitted. The purpose of the element 24 may be to prevent the flow of the metal-halide electrolyte from contacting the active metal electrode, when passing through a porous electrode of an adjacent cell located beneath. In other words, element 24 prevents the electrolyte from touching one side (e.g., the bottom side) of every metal electrode 25 so that the metal (e.g., zinc) plates only on the opposite side (e.g., the top side) of the metal electrode 25. In some cases, the element 24 may comprise the polymer or plastic material.

FIG. 2 also shows barriers 30. Each barrier 30 may be a part of a cell frame 31 discussed in a greater detail below. Barrier 30 may separate the positive electrode from the negative electrode of the same cell. Barriers 30 may comprise an electrically insulating material, which can be a polymeric material, such as PTFE. The cell frames 31 can be made of a polymeric material, such as PTFE. The cell frames 31 may comprise plate shaped frames which are stacked on top of each other such that openings in the cell frames are aligned to form manifolds 21, 27 and 29. However, other manifold configurations may be used if desired.

In the configuration depicted in FIG. 2, the metal-halide electrolyte may be forced to flow down through the porous electrode and then up to leave the cell. Such a down-and-up flow path may enable an electrical contact of the porous electrode and the metal electrode in each cell with a pool of the metal halide electrolyte remaining in each cell when the electrolyte flow stops and the feed manifold, distribution zone, collection zone, and return manifold drain. Such a contact may allow maintaining an electrical continuity in the stack of cells when the flow stops and may provide for an uninterrupted power supply (UPS) application without continuous pump operation. The down-and-up flow path within each cell may also interrupt shunt currents that otherwise would occur when electrolyte flow stops. The shunt currents are not desired because they may lead to undesirable self-discharge of the energy stored in the system and an adverse non-uniform distribution of one or more active materials, such as an oxidizable metal, such as Zn, throughout the stack.

Figure 3A:
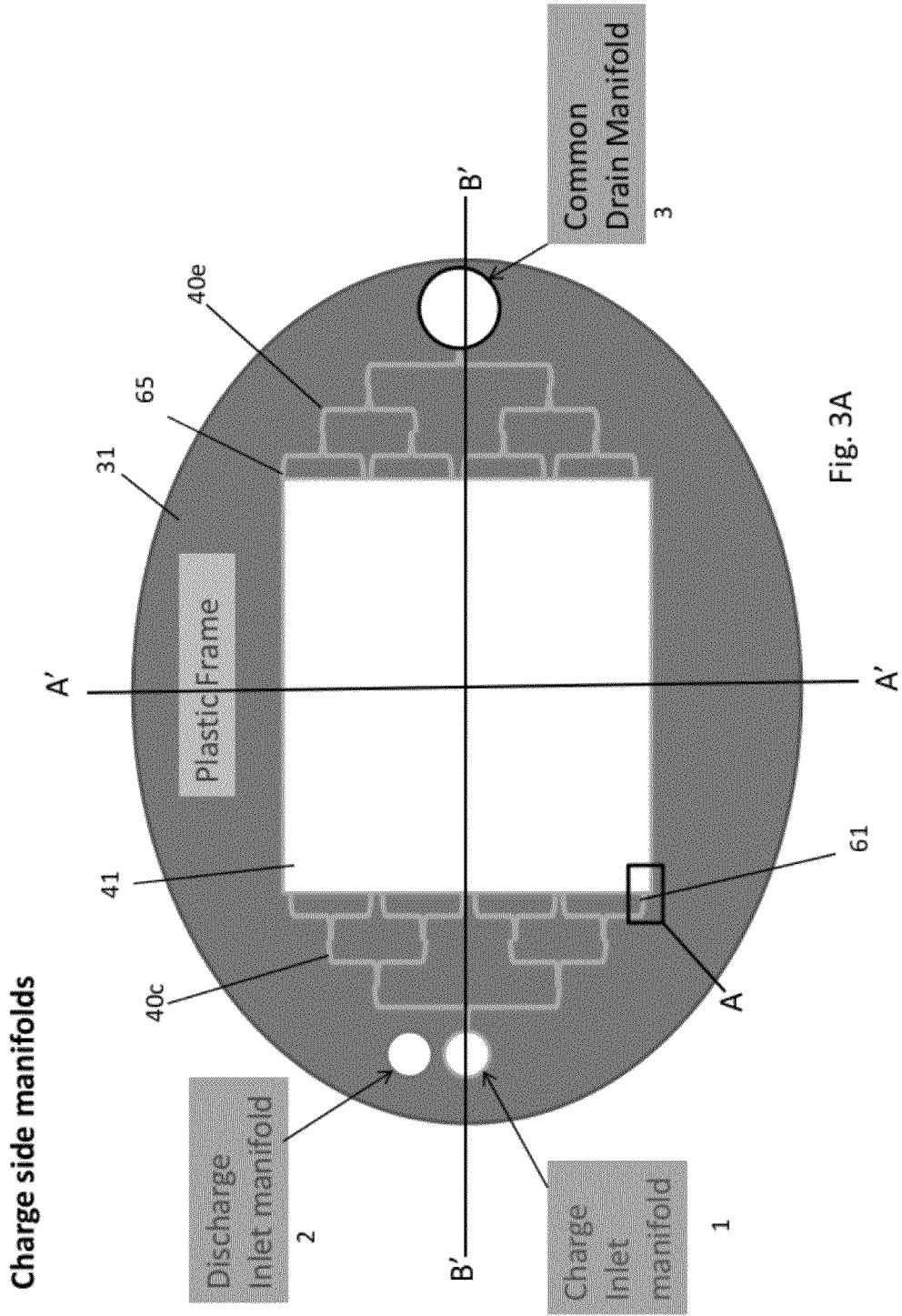
FIG. 3A is a plan view of a first, charge side of a frame for holding the horizontally positioned cells illustrated in FIG. 2.
Figure 3B:
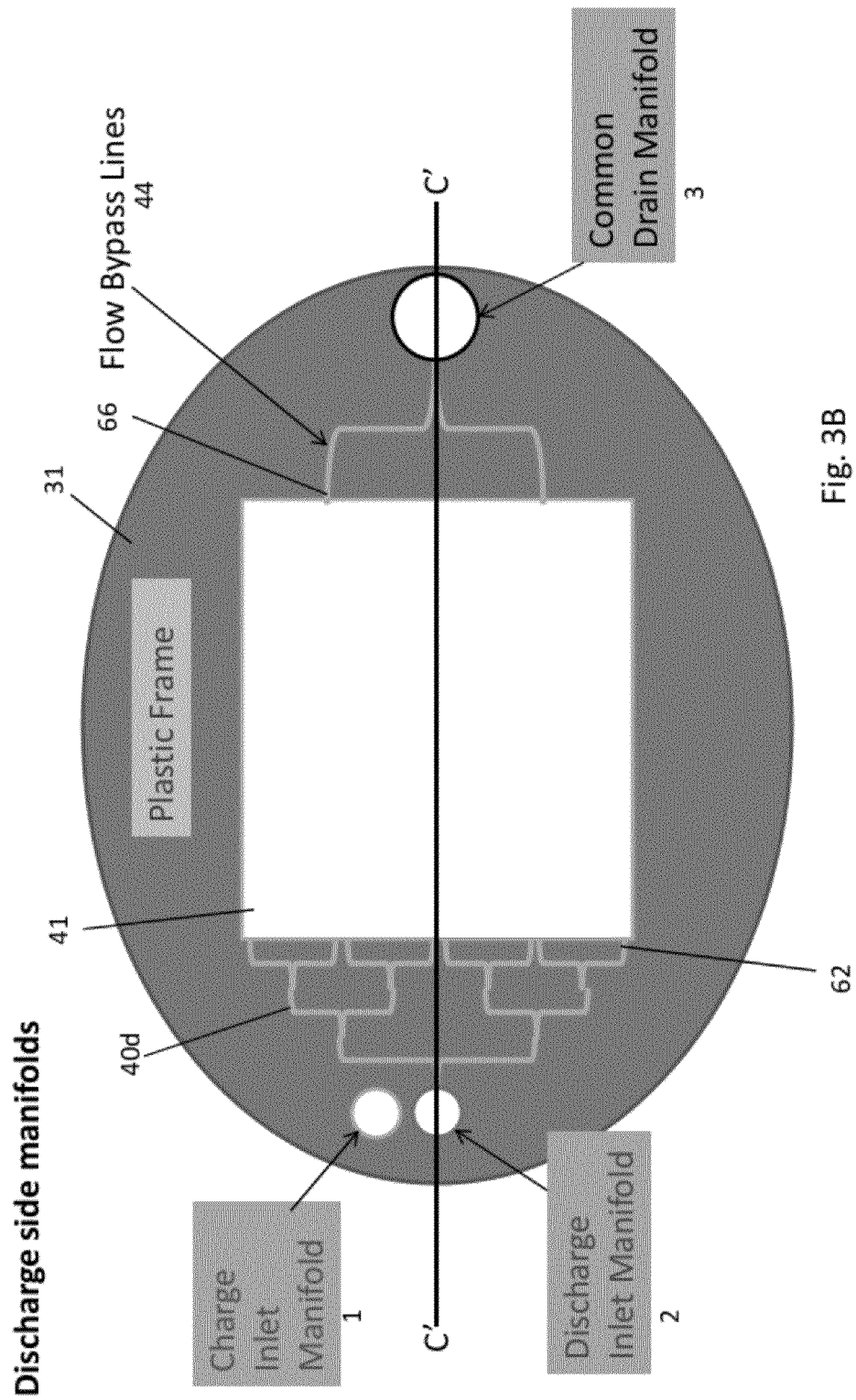
FIG. 3B is a plan view of a second, discharge side of the frame illustrated in FIG. 3A.

FIGS. 3A and 3B illustrate the features of charge face or surface (e.g., bottom surface) and discharge face or surface (e.g., top surface), respectively, of a frame 31 for holding the horizontally positioned electrochemical cells illustrated in FIG. 2. The frame 31 includes a charge mode inlet manifold 1 through which electrolyte is supplied to the electrochemical cells during charge mode. As noted above, the manifold 1 is a hole through the frame 31 which aligns with similar holes in other stacked frames 31 to form the manifold. The manifold 1 may comprise the same manifold as the manifolds 115, 21 shown in FIGS. 1 and 2. The electrolyte flows from the charge mode inlet manifold 1 through flow channels 40c and inlet 61 in the frame 31 to the electrochemical cells. In the embodiment illustrated in FIG. 3A, the charge mode inlet manifold 1 connects to a single flow channel 40c which successively divides into subchannels (i.e., flow splitting nodes where each channel is split into two subchannels two or more times) to provide a more even and laminar electrolyte flow to the electrodes 23, 25. After passing across the electrodes 23, 25, the electrolyte exits the cells via common exit 65 into flow channels 40e on an opposite end or side of the frame 31 from the charge inlet manifold 1. The electrolyte empties from the exit flow channels 40e to a common outlet (i.e., drain) manifold 3. The outlet manifold 3 may comprise the same manifold as manifolds 121 and 27 in FIGS. 1 and 2, respectively. Exit channels 40e may also comprise flow splitting nodes/subchannels as shown in FIG. 3A. As illustrated in FIG. 3A, only the charge mode inlet manifold 1 is fluidly connected to the channels 40c on the charge side of the frame 31.

As illustrated in FIG. 3B, on the discharge side, the discharge mode inlet manifold 2 (not shown in FIGS. 1 and 2) is connected to discharge inlet channels 40d while the charge inlet manifold 1 is fluidly isolated from the discharge inlet channels 40d. The common outlet (i.e., drain) manifold 3 is connected to the electrochemical cells via optional bypass channels 44 on the discharge (e.g., top) surface of the frame 31. The operation of the bypass channels 44 and bypass outlet 66 is discussed in more detail below. Otherwise, the electrolyte flow passes from channels 40d and inlet 62 through the porous electrode 23, flows through a reaction zone of a cell and then exits via the common exit or outlet 65 and then outlet channels 40e to the common outlet manifold 3.

Figure 4:
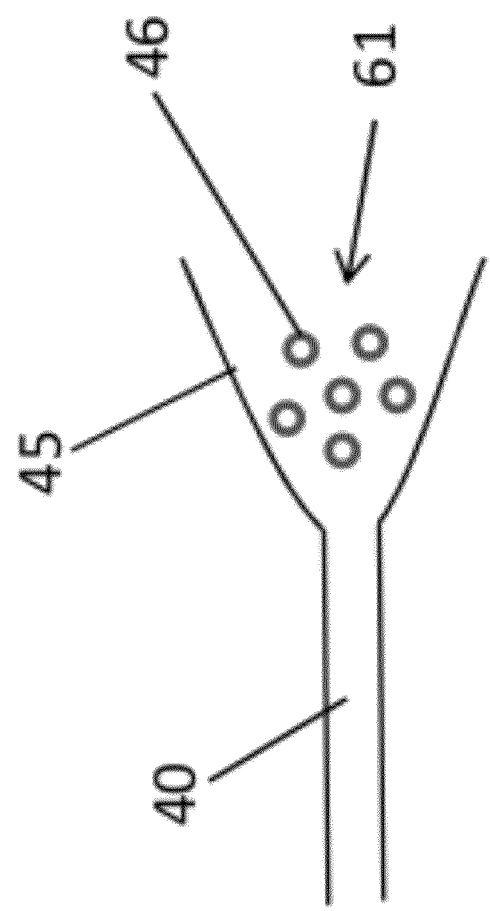
FIG. 4 is a plan view illustrating details of the portion "A" of a flow channel of FIG. 3A.

FIG. 4 illustrates details of the portion of FIG. 3A identified by the box labeled "A". In an embodiment, the inlet 61 from each of the charge mode flow channels 40c into the central open space 41 which contains the electrochemical cells includes an expansion portion 45. Portion 45 has a larger width than the remaining channel 40c, and may have a continuously increasing width toward the inlet 61 (i.e., triangular shape when viewed from above). The expansion portion 45 aids in spreading the electrolyte and thereby providing a more even and laminar flow distribution of electrolyte across the electrodes 23, 25. In an embodiment, the expansion portion 45 further includes bumps or pillars 46. The bumps or pillars 46 interact with the flowing electrolyte to reduce turbulence in the inlet flow. In this manner, a smoother, more laminar electrolyte flow can be provided to the electrodes 23, 25.

Figure 5:
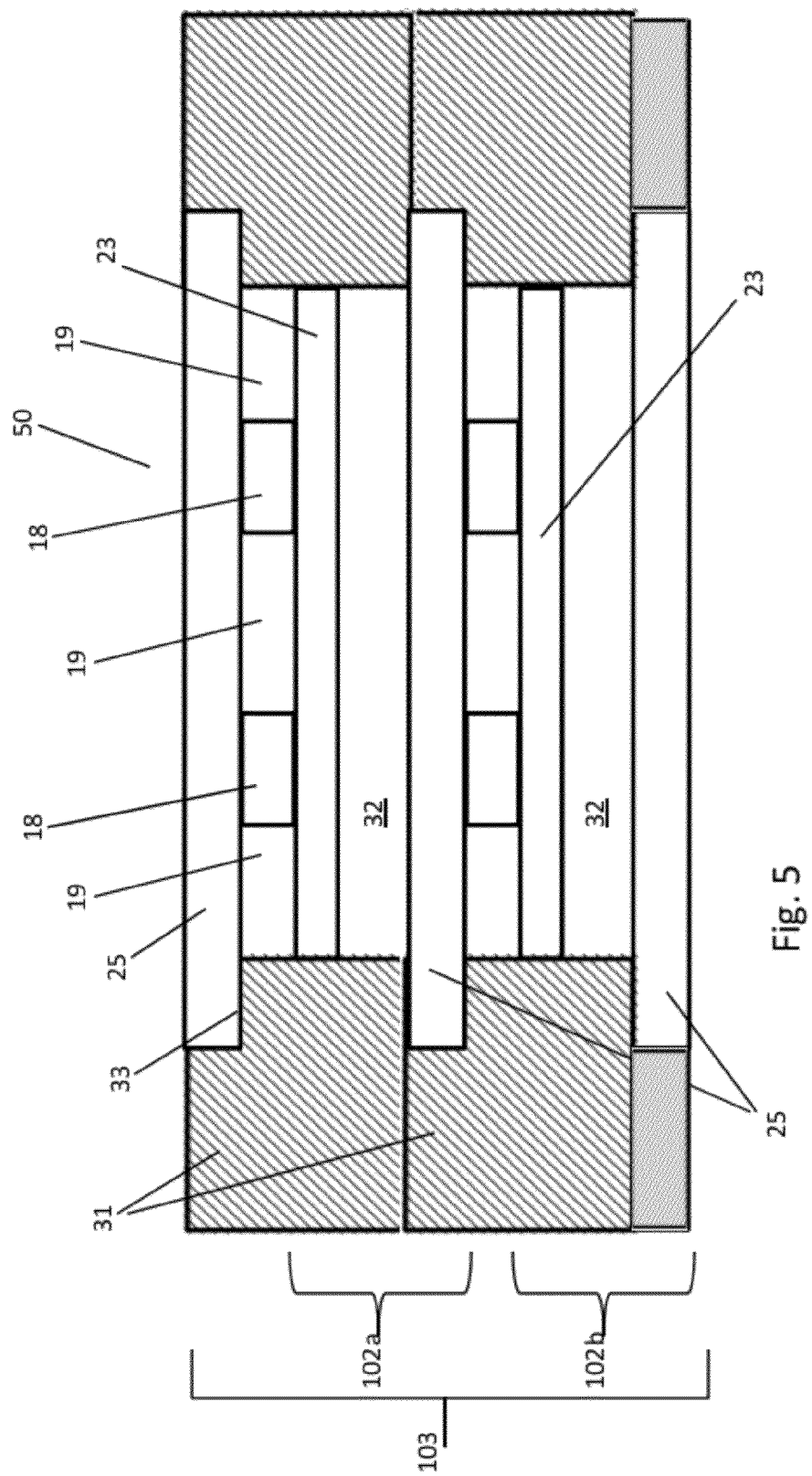
FIG. 5 is a cross section of a stack of electrochemical cells through the line A'-A' in FIG. 3A.

FIG. 5 illustrates a cross section of an embodiment of a stack of electrochemical cells in a stack of frames through the line A'-A' in FIG. 3A. The cross section A'A' is transverse to the flow of electrolyte in the electrochemical cell from inlet manifold 1 to outlet manifold 3. In this embodiment, the frame 31 includes ledges 33 on which the non-porous (negative) metal electrode 25 is seated. Additionally, the non-porous electrode 25 of a first electrochemical cell 102a is spaced apart from and connected to the porous (positive) electrode 23 of an adjacent electrochemical cell 102b by electrically conductive spacers 18, such as metal or carbon spacers. An electrolyte flow path is thereby formed between the non-porous electrode 25 of the first electrochemical cell 102a and the porous electrode 23 of an adjacent electrochemical cell 102b. Further, the conductive spacers divide the electrolyte flow path into a series of flow channels 19.

In an embodiment, the electrodes 23, 25 of adjacent electrochemical cells 102 are provided as an assembly 50. In this embodiment, the non-porous electrode 25 of a first electrochemical cell 102a, the conductive spacers 18 and the porous electrode 23 of an adjacent electrochemical cell 102b are assembled as a single unit. The individual components may be glued, bolted, clamped, brazed, soldered or otherwise joined together. The fabrication of an electrode assembly 50 simplifies and speeds the assembly of stacked flow cell device. Each electrode assembly is placed into a respective frame 31, such that one electrode (e.g., the larger non-porous electrode 25) is supported by the ledges 33 in the frame 31, and the other electrode (e.g., the smaller porous electrode 23) hangs in the space 41 between the ledges 33 by the spacers 18 from the other electrode. Of course the order of the electrodes may be reversed and the porous electrode may be supported by the ledges 33. Other electrode attachment configurations, such as bolting or clamping to the frame, may be used. The frames 31 with the electrodes 23, 25 are stacked upon each other to form a stack 103 of cells. As each frame is stacked, a new cell 102a is created with a reaction zone 32 in between the bottom porous electrode 23 of an upper frame and a top non-porous electrode 25 of an adjacent lower frame. As seen in FIG. 5, the electrodes 23, 25 of the same cell (e.g., 102a) do not physically or electrically contact each other and comprise a portion of separate electrode assemblies.

Figure 6:
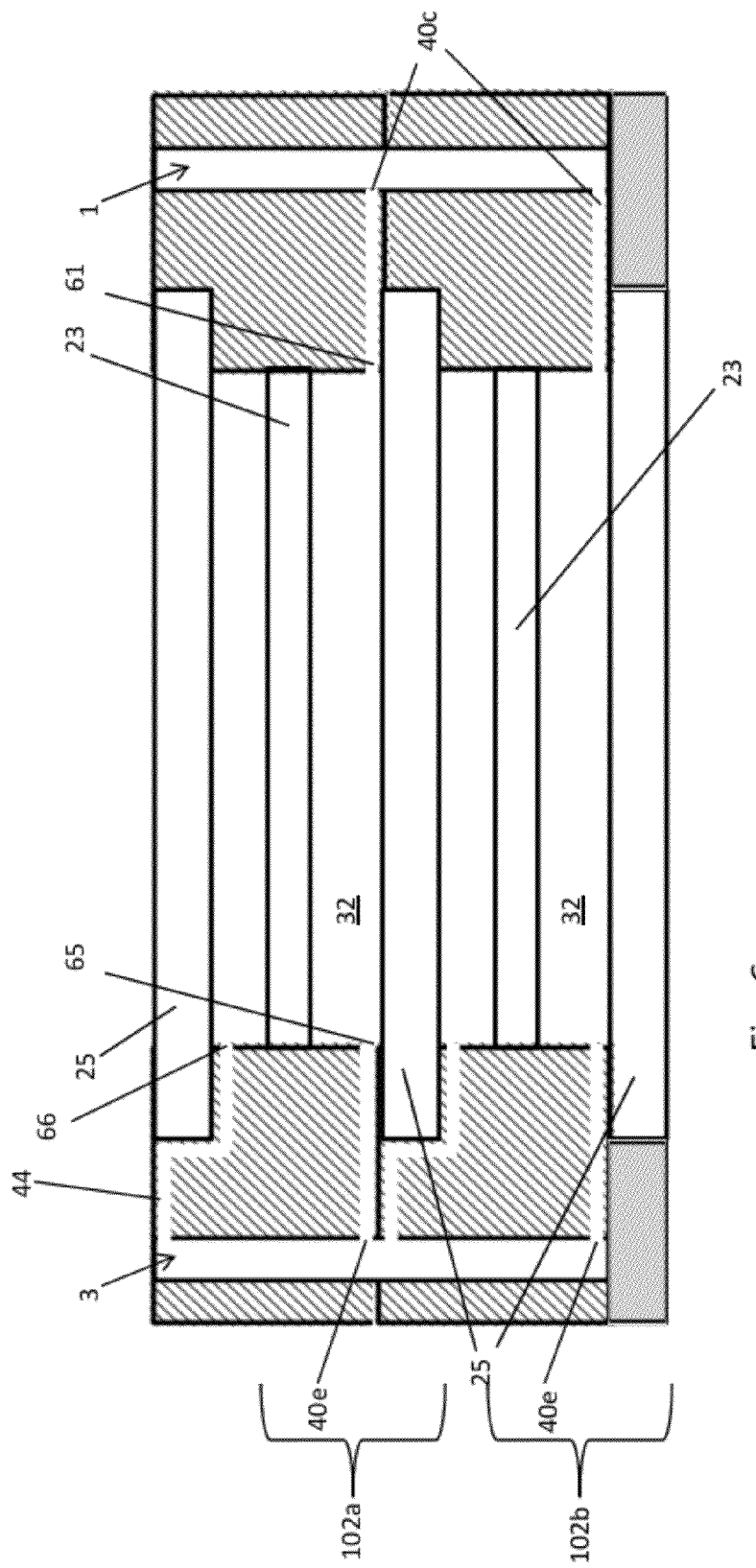
FIG. 6 is a cross section of a stack of electrochemical cells through the line B'-B' in FIG. 3A.

FIG. 6 illustrates a cross section of a stack of electrochemical cells through the line B'B' in FIG. 3A. This cross section cuts across the charge inlet manifold 1 though the stack 103 of electrochemical cells 102 and the common outlet drain manifold 3. As illustrated, the common outlet drain manifold 3 is on the left side FIG. 6 while the charge inlet manifold 1 is on the right side of FIG. 6. That is, FIG. 6 is the mirror image (i.e., 180 degree rotation of the cross section) of FIG. 3A such that FIG. 6 may be advantageously used in combination with FIGS. 8-12 for explanation of the electrolyte flows in the flow battery. Specifically, the cross section of FIG. 6 illustrates the configuration of the frames 31 and cells 102 for the charge flow configuration illustrated in FIG. 8.

To achieve the flow configuration illustrated in FIG. 8 (100% flow-by flow in charge mode), the frame is provided with flow-by channels 40c in the bottom face of the frame. The channels 40c connect the charge inlet manifold 1 to the reaction zone 32 of each cell, such that 100% of the incoming electrolyte in charge mode flows across the non-porous electrode 25 to deposit a layer of zinc on top of each electrode 25 in each cell 102. None of the incoming electrolyte is delivered from the charge inlet manifold 1 directly to the porous electrode 23 or through the porous electrode 23 into the reaction zone 32. At the opposite end of the electrochemical cell from the charge inlet manifold 1, an outlet flow channel 40e is provided in the bottom face of the frame 31 for the electrolyte to reach the common outlet drain manifold 3. The frame 31 also includes bypass channels 44 on the top face or surface of the frame that allow electrolyte in the flow channels 19 to exit to the common outlet drain manifold 3.

FIG. 7 is a cross section of a stack of electrochemical cells through the line C'-C' in FIG. 3B. FIG. 7 is the mirror image (i.e., 180 degree rotation of the cross section) of FIG. 3B. This cross section corresponds to the discharge flow configuration illustrated in FIG. 10 (100% flow-through discharge flow). The channels 40d connect the discharge inlet manifold 2 in the frame 31 to the flow channels 19 between the spacers 18 in each electrode assembly 50. Electrolyte enters the cells 102 via discharge mode inlet manifold 2 by passing through flow-though channels 40d configured to deliver electrolyte to the top of the porous electrodes 23 via inlet 62 and flow channels 19. Because there are no flow-by channels 40c on the top face of the frame 31 which are connected to the manifold 2, all of the electrolyte is provided to the top of the porous electrode 23. Under a modest electrolyte flow rate, all of the electrolyte flows through the porous electrode 23 to the reaction zone 32 below. The electrolyte then exits the cells 102 through outlet flow channels 40e to the common outlet drain manifold 3. Under higher electrolyte flow rates, some of the electrolyte may exit the flow channels 19 via the bypass outlet 66 and bypass channels 44 to the common outlet drain manifold 3 without passing through the porous electrode 23, reaction zone 32 and channels 40e. Alternatively, the cells and frames may be turned upside down, such that the charge mode channels 40c are on top and the discharge mode channels 40d are on the bottom of each frame.

Thus, as shown in FIGS. 3A, 3B, 5, 6, 8 and 10, the charge mode electrolyte inlet 61 is located in the reaction zone 32 between the first 23 and the second 25 electrodes. Inlet 61 is connected to the channels 40c in the bottom of the frame, which are connected to the charge mode inlet manifold 1. The discharge mode electrolyte inlet 62 is located outside the reaction zone 32 adjacent to a surface of the first electrode 23 facing away from the reaction zone 32. Specifically, inlet 62 is located between channels 19 above the porous electrode 23 and the channels 40d in the top of the frame 31 which connect to manifold 2. The common electrolyte outlet or exit 65 is located in the reaction zone 32 between the first 23 and the second electrodes 25. The outlet 65 is connected to channels 40e in the bottom of the frame 31 which connect to manifold 3.

FIGS. 8-12 illustrate side cross sections of flow cell embodiments with different flow configurations in charge and discharge modes. The different flow conditions are generated by having separate electrolyte charge mode inlet manifold 1 and discharge mode inlet manifold 2 into the cells in the stack. A common electrolyte outlet manifold 3 may be used in charge and discharge modes. Thus, the flow battery preferably includes a charge mode inlet manifold 1, a discharge mode inlet manifold 2 different from the charge mode inlet manifold 1 and a common charge and discharge mode electrolyte outlet manifold 3. Preferably, the common electrolyte outlet manifold 3 is configured to allow the electrolyte out of the reaction zone in both the charge and the discharge modes. In an embodiment, the inlet 61 from the channels 40c leading from the charge mode inlet manifold 1 is located in or directly adjacent the reaction zone 32 between the first and the second electrodes 23, 25. The inlet 62 from the channels 40d leading from the discharge mode inlet manifold 2 is located outside the reaction zone 32 adjacent to a surface of the first electrode 23 facing away from the reaction zone 32. The outlet or exit 65 leading to channels 40e to the common electrolyte outlet manifold 3 is located in or directly adjacent the reaction zone 32 between the first and the second electrodes 23, 25.

Alternatively, separate outlets may be used in charge and discharge modes if desired. FIGS. 8, 9A, 9B, 9C and 9D illustrate different flow configurations for the charge mode. FIGS. 10, 11A and 11B illustrate different flow configurations for the discharge mode. FIGS. 12A, 12B and 12C illustrate flow configuration for charge mode and discharge mode in a cell containing segmented electrodes 23, 25.

As noted above, FIGS. 8, 9A, 9B, 9C and 9D illustrate the electrolyte flow in charge mode. In the embodiment illustrated in FIG. 8, the electrolyte flow is configured in a 100% "flow-by" mode. In charge mode flow-by mode, the electrolyte flows from the manifold 1 through the charge inlet 61 directly into the reaction zone 32. That is, the electrolyte flows past or by the first and second electrodes 23, 25 without passing through either electrode. After passing through the reaction zone 32, the electrolyte exits the flow cell 102 via exit 65 to the channels 40e and then into the common outlet manifold 3.

In the embodiment illustrated in FIG. 9A, the majority of the electrolyte flows in charge mode flow-by mode while a minority of the electrolyte flows in charge mode "flow-through" mode. In charge mode flow-through mode, the electrolyte flows through the porous electrode 23. In this embodiment, the electrolyte is provided in charge mode from manifold 2 via inlet 62 to the top of the porous electrode 23 and flows down through the porous electrode 23 into the reaction zone 32 under the force of gravity. As in the previous embodiment, the electrolyte exits the flow cell 102 via exit 65 into channels 40e and then into the common outlet manifold 3. Alternatively, if the electrolyte is provided to the top of the porous electrode 23 via manifold 1, then a separate opening is added between manifold 1 and channels 40d on top of the frame 31.

The embodiment illustrated in FIG. 9B is similar to the embodiment illustrated in FIG. 9A. However, in this embodiment, a majority of the electrolyte is provided to the flow cell 102 in charge mode flow-though mode during the charging cycle of the cell. A minority of the electrolyte is provided in charge mode flow-by mode during charge. Thus, in this embodiment, at least a portion of the electrolyte is provided in charge mode flow-by mode.

Figure 9C:
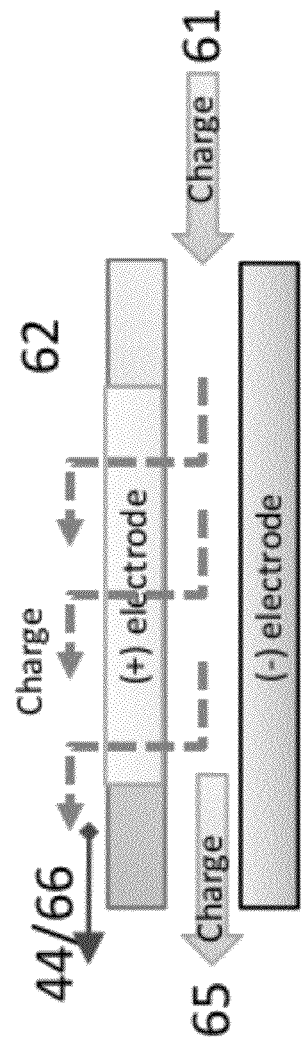
FIG. 9C illustrates a side cross section of another embodiment of an electrolyte flow configuration during charge mode. The electrolyte flow is configured for majority flow-by flow with minority flow-through flow up through the porous electrode. In contrast to the embodiment illustrated in FIG. 9A, the minority flow-through flow exits the cell through a bypass.

In FIG. 9C the electrolyte is provided to the flow cell 102 from the charge mode inlet manifold 1 via flow-by channels 40c and inlet 61 in the frame 31. A majority of the electrolyte flows across the metal electrode 25 in charge mode flow-by mode. However, unlike the embodiment illustrated in FIG. 8, the rate of electrolyte flow is such that a minority of the electrolyte flows up through the porous electrode 23 and exits via bypass 44 into manifold 3.

Figure 9D:
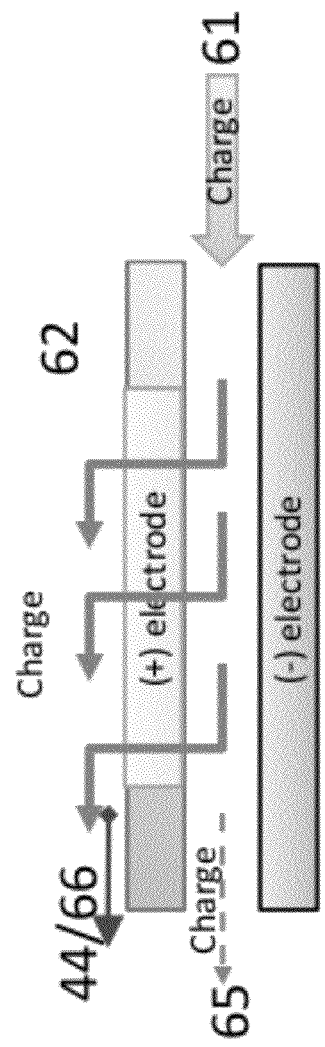
FIG. 9D illustrates a side cross section of an embodiment of an electrolyte flow configuration during charge mode. The electrolyte flow is configured for minority flow-by flow and majority flow-through flow up through the porous electrode. In contrast to the embodiment illustrated in FIG. 9B, the majority flow-through flow exits the cell through a bypass.

The embodiment illustrated in FIG. 9D is similar to the embodiment illustrated in FIG. 9C. However, in this embodiment, the flow rate of the electrolyte and the relative sizes of the outlet flow channels 40e and the bypass channels 44 are such that a majority of the electrolyte flows up through the porous electrode 23 in charge mode and exits via bypass 44 into manifold 3. In this embodiment, a minority of the electrolyte flows across the non-porous electrode 25 exits via exit 65 and channels 40e.

As noted above, FIGS. 10 and 11A-11B illustrate the electrolyte flow in discharge mode. The flow configurations in discharge mode are similar to the flow configurations in charge mode. During discharge mode, however, at least a portion of the electrolyte flows though the porous electrode 23. In the embodiment illustrated in FIG. 10, the electrolyte flows in 100% discharge flow-through mode. That is, 100% of the electrolyte flows from the discharge inlet manifold 2, through channels 40*d* and 19 and the porous electrode 23 into the reaction zone 32. After passing through the reaction zone 32, the electrolyte exits the flow cell 102 via exit 65 and channels 40*e* to the common outlet drain manifold 3.

In the discharge mode embodiment illustrated in FIG. 11A, a majority of the electrolyte is provided in discharge flow-though mode (i.e., from manifold 2, through the channels 40*d* and 19 and through the porous electrode 23) while a minority of the electrolyte is provided in discharge flow-by mode (i.e., between electrodes 23 and 25 into reaction zone 32). In the discharge mode embodiment illustrated in FIG. 11B, a majority of the electrolyte is provided in the discharge flow-by mode while a minority of the electrolyte is provided in the discharge flow-through mode. In the flow-through mode, the electrolyte may be provided via manifold 1. Alternatively, if the electrolyte is provided via manifold 2, then an additional opening is provided between manifold 2 and channels 40*c*.

In the embodiments illustrated in FIGS. 11A, 11B and 11C, the electrodes 23, 25 are segmented. That is, rather than being made as a single, integral component, the electrodes 23, 25 comprise a plurality of separate electrode members 23*a*, 23*b*, 25*a*, 25*b*. In this embodiment, one or more common outlet drain manifolds 3 (e.g., aligned outlet openings or holes in between the electrode members segments) are provided between the separate electrode members 23*a*, 23*b*, 25*a*, 25*b*. Common outlet drain manifolds 3 can be provided in the first electrode 23, the second electrode 25 or both electrodes 23, 25. For electrodes having a circular shape when viewed from the top, the common outlet drain manifold 3 may be in the middle while the electrode members comprise wedge shaped segments arranged around the common outlet drain manifold 3.

The flow configuration illustrated in FIG. 12A is 100% flow-by in charge mode while the flow illustrated in FIG. 12B is 100% flow-through in discharge mode. However, as in the previous embodiments illustrated in FIGS. 9A and 9B, the charge mode flow may be configured with partial flow-by and partial flow-through. Further, as in the previous embodiments illustrated in FIGS. 10A and 10B, the discharge mode flow may be configured with partial flow-by and partial flow-through.

FIG. 12C illustrates another charge mode embodiment with segmented electrodes 23, 25. In this embodiment, similar to the embodiment illustrated in FIG. 9C, the electrolyte is supplied directly to the reaction zone 32 at a relatively high flow rate. A majority of the electrolyte flows in charge mode flow-by mode while a portion of the electrolyte is forced up through the porous electrode 23. In this embodiment, most of the electrolyte directly exits the flow cell 102 via exit 65 and channels 40*e* to the common outlet drain manifold 3 while some of the electrolyte passes through bypass channels 44 to the common outlet drain manifold 3.

As discussed above, the inventors have discovered that by providing different flow configurations in charge and discharge modes, a flatter, smoother and denser metal electroplating can be achieved. The different charge and discharge mode flow configurations illustrated in FIGS. 8-9 and 10-11 can be combined as identified by the connecting lines labeled 4, 5 and 6 between these figures. The charge mode flow configurations illustrated in FIGS. 9C and 9D can be combined with the discharge flow configurations illustrated in FIGS. 10, 11A and 11B.

For example, the 100% flow-by charge mode embodiment illustrated in FIG. 8 can be combined with the 100% flow-through discharge mode embodiment of FIG. 10, the majority flow-through discharge mode embodiment of FIG. 11A or the minority flow-through discharge mode embodiment of FIG. 11B, as illustrated by arrows 4. Thus, in an embodiment of the flow battery, the charge mode inlet manifold 1 is configured to provide all the electrolyte into the reaction zone 32 in charge mode flow-by mode while the discharge mode inlet manifold 2 is configured to provide no electrolyte into the reaction zone 32 in discharge mode flow-by mode. Alternatively, the discharge mode inlet manifold 2 is configured to provide all or a portion of the electrolyte into the reaction zone 32 in the discharge mode flow-through mode and a portion of the electrolyte into the reaction zone 32 in discharge mode flow-by mode.

Alternatively, the majority flow-by charge mode embodiment illustrated in FIG. 9A can be combined with the 100% flow-though discharge mode embodiment illustrated in FIG. 10 or the majority flow-though discharge mode embodiment illustrated in FIG. 11A, as illustrated by arrows 5. Thus, in an embodiment, the charge mode inlet manifold 1 is configured to provide a major portion of the electrolyte into the reaction zone 32 in the charge mode flow-by mode and the discharge mode inlet manifold 2 is configured to provide all of the electrolyte into the reaction zone 32 in the discharge mode flow-through mode. Alternatively, the charge mode inlet manifold 1 is configured to provide a major portion of the electrolyte into the reaction zone 32 in the charge mode flow-by mode and the discharge mode inlet manifold 2 is configured to provide a minor portion of the electrolyte into the reaction zone 32 in the charge mode flow-by mode and the rest in discharge mode flow-through mode.

Alternatively, the minority flow-by embodiment illustrated in FIG. 9B may be combined with the 100% flow-through discharge mode embodiment illustrated in FIG. 10 or the minority flow-through discharge embodiment illustrated in FIG. 11B, as shown by arrows 6. Thus, in an embodiment, the charge mode inlet manifold 1 is configured to provide a minor portion of the electrolyte into the reaction zone 32 in the charge mode flow-by mode and the discharge mode inlet manifold 2 is configured to provide all of the electrolyte into the reaction zone 32 in the discharge mode flow through mode. Alternatively, the charge mode inlet manifold 1 is configured to provide a minor portion of the electrolyte into the reaction zone 32 in the charge mode flow-by mode and the discharge mode inlet manifold 2 is configured to provide a minority the electrolyte into the reaction zone 32.

The charge mode embodiments illustrated in FIGS. 9C and 9D may be combined with any of the discharge mode embodiments illustrated in FIG. 10, 11A or 11B. Thus, in charge mode, electrolyte may initially supplied charge mode flow-by mode with subsequent portions of the electrolyte flowing up through the porous electrode in charge mode flow-though mode while in discharge mode the electrolyte may be supplied in 100% discharge mode flow-through mode (FIG. 10), majority discharge mode flow-through mode (FIG. 11A) or minority discharge mode flow-through mode (FIG. 11B).

As used above, the term "major portion" means more than 50% of the electrolyte by volume, such as 51-99%, for example, 60-90% by volume. The term "minor portion" means less than 50% of the electrolyte by volume, such as 1-49%, for example, 10-40% by volume.

The segmented electrode charge and discharge mode flow configurations illustrated in respective FIGS. 12A, 12B and 12C may be combined similarly as the embodiments illustrated in FIGS. 8-9 and 10-11. That is, a 100% flow-by charge mode embodiment can be combined with a 100% flow-through discharge mode embodiment, a majority flow-through discharge mode embodiment or a minority flow-through discharge mode embodiment. Alternatively, a majority flow-by charge mode embodiment can be combined with a 100% flow-though discharge mode embodiment or a majority flow-though discharge mode embodiment. Alternatively, a minority flow-by charge mode embodiment may be combined with a 100% flow-through discharge mode embodiment or a minority flow-through discharge mode embodiment. Further, the embodiments illustrated in FIGS. 8-11 can be combined with the embodiments illustrated in FIGS. 12A, 12B and 12C. That is, one of either the first electrode 23 or the second electrode 25 may be a single integral electrode while the other is segmented.

In summary, as described above, the flow battery is configured with a first electrolyte flow configuration in charge mode and a second flow configuration in discharge mode. The first electrolyte flow configuration is at least partially different from the second electrolyte flow configuration. In the charge mode, at least a portion of the electrolyte is provided from a charge mode inlet manifold 1 into the reaction zone 32 and from the reaction zone 32 into a common electrolyte outlet manifold 3. In the discharge mode, at least a portion of the electrolyte is provided from a discharge mode inlet manifold 2 into the reaction zone 32 and from the reaction zone 32 into the common electrolyte outlet manifold 3. Thus, the flow battery may operate with a higher voltaic and columbic efficiency than the same battery operating with the same first and second flow configurations.

Figure 13A:
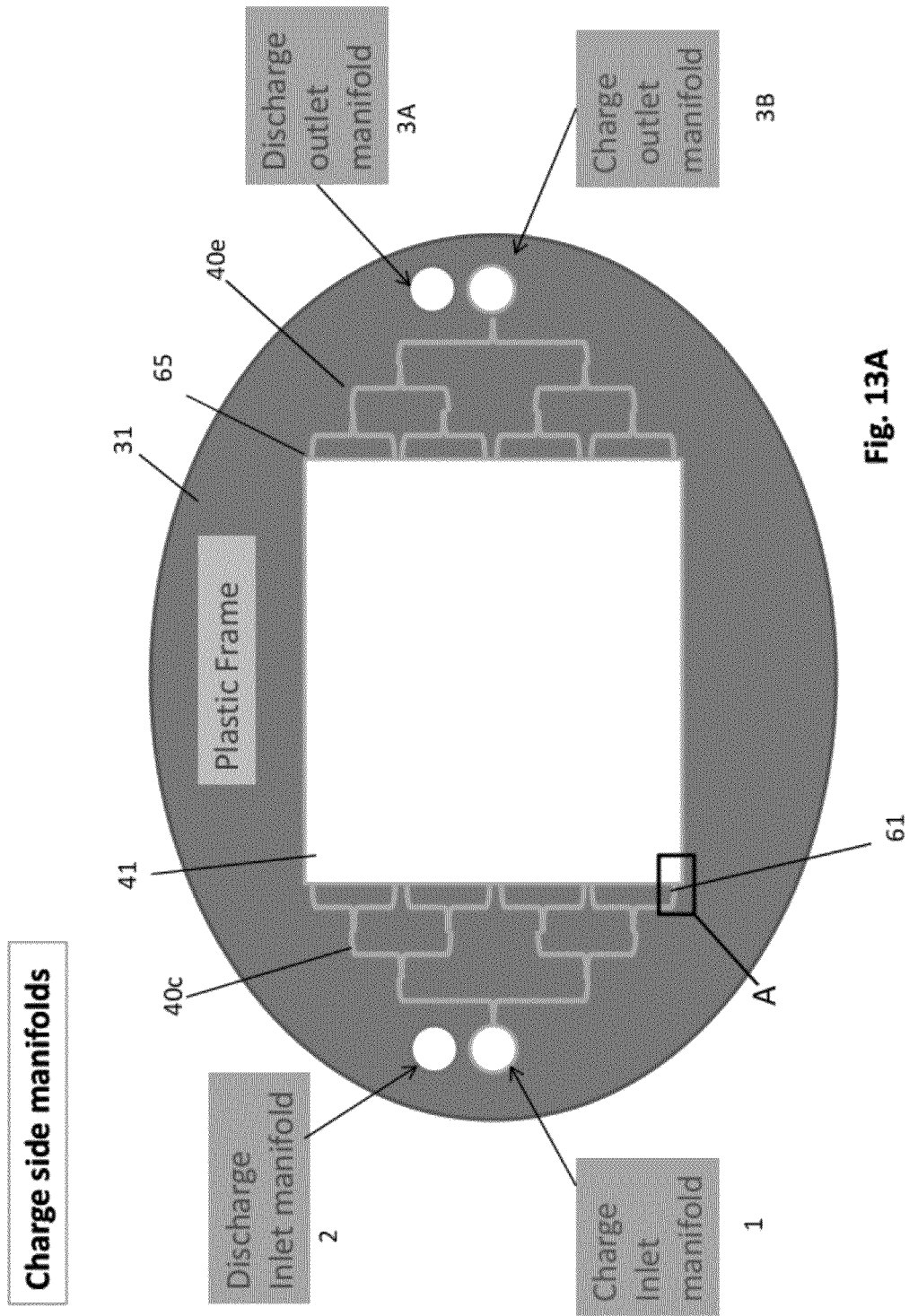
FIG. 13A is a plan view of a first, charge side of a frame of an alternative embodiment for holding the horizontally positioned cells illustrated in FIG. 2.
Figure 13B:
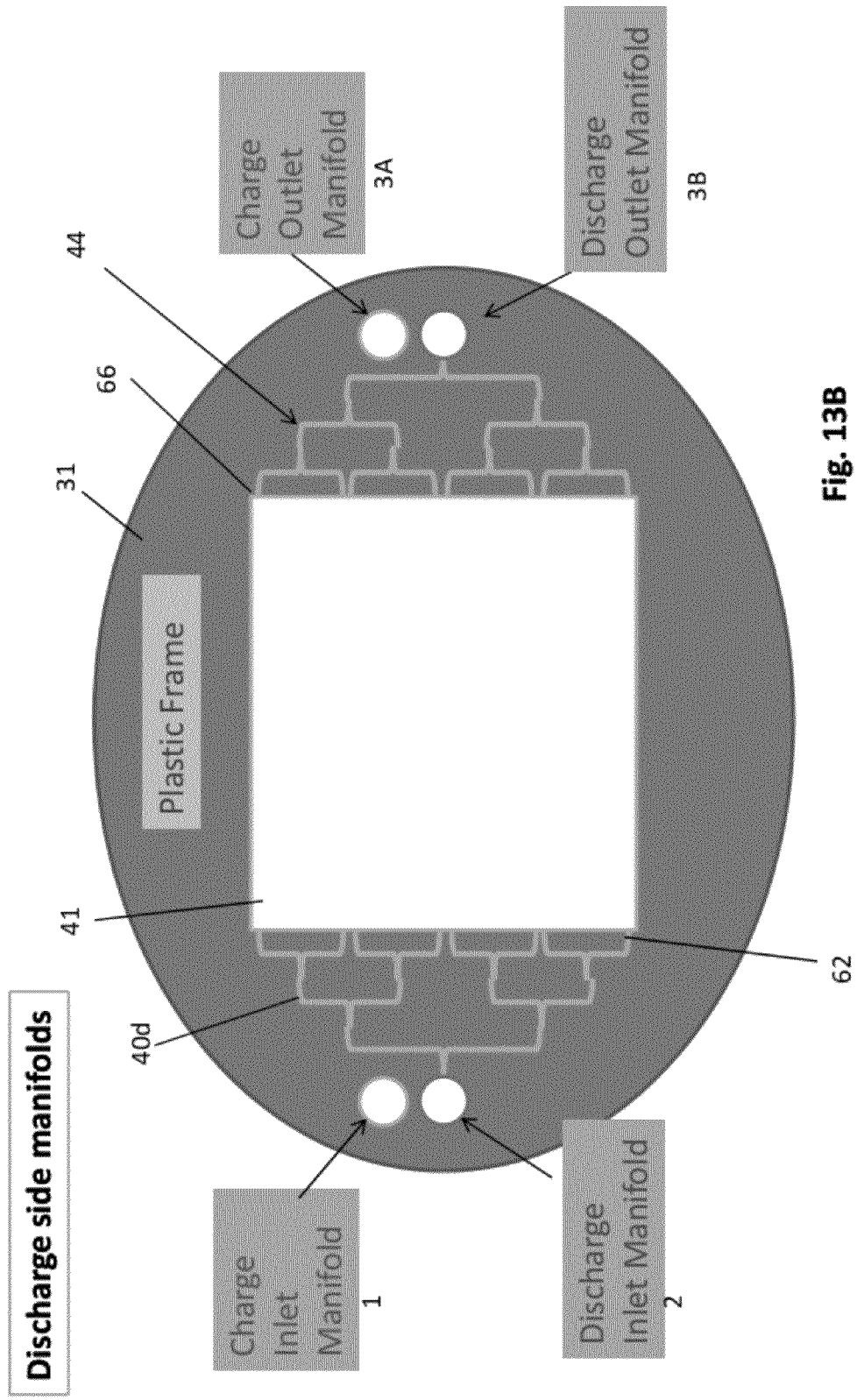
FIG. 13B is a plan view of a second, discharge side of the frame of the alternative embodiment illustrated in FIG. 13A.
Figure 13C:
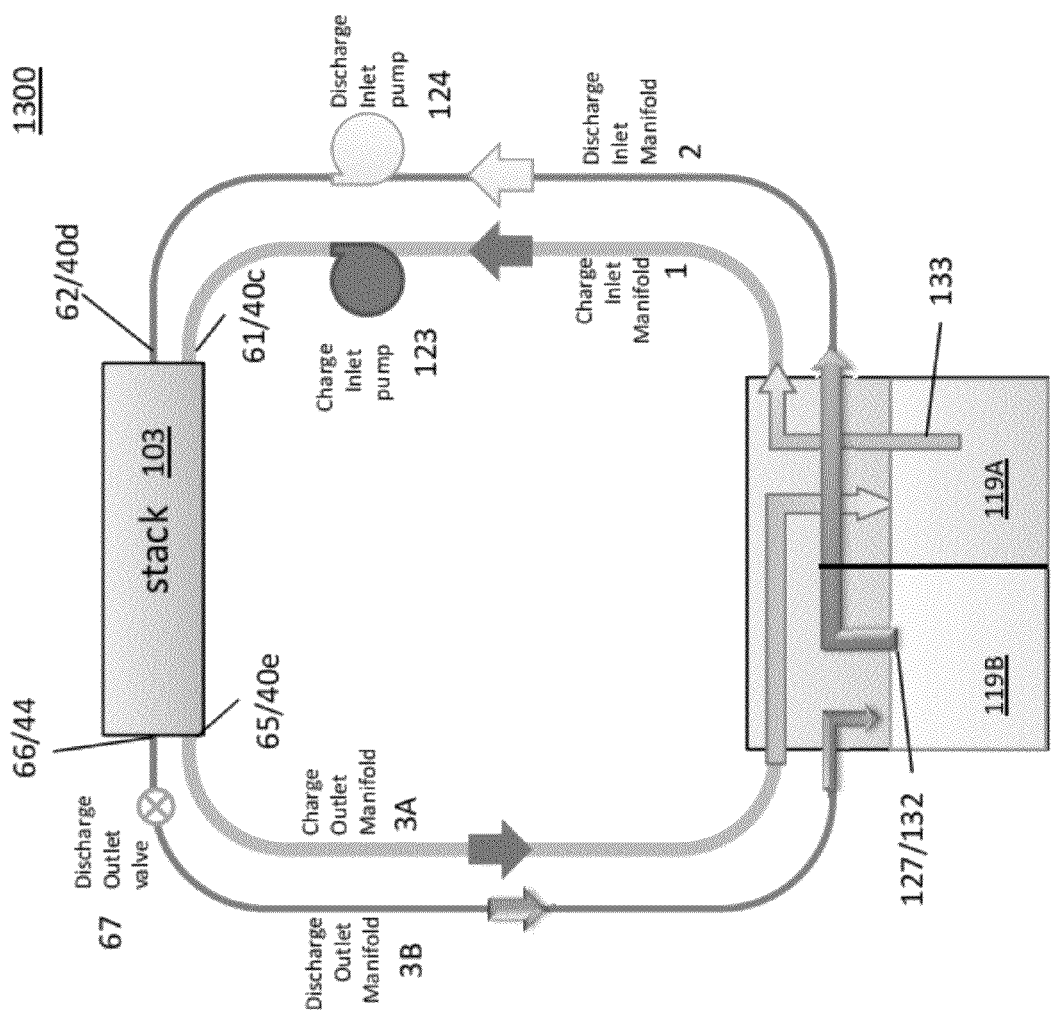
FIG. 13C is a schematic diagram of components of the electrochemical system of the alternative embodiment.

FIGS. 13A-13C illustrate an alternative embodiment of the invention which contains two reservoirs and two outlet manifolds in the frames. FIGS. 13A and 13B illustrate charge and discharge sides, respectively, of a frame 31 of the alternative embodiment. The frame shown in FIGS. 13A and 13B is similar to the frame shown in FIGS. 3A and 3B, except that the common outlet manifold 3 is replaced with different and separate charge mode outlet manifold 3A and discharge mode outlet manifold 3B. While the manifolds 3A and 3B are referred to as "charge" and "discharge" mode outlet manifolds, these designations are used for convenience only. As will be described in more detail below, both manifolds are preferably used in the charge mode and only the "charge" mode outlet manifold is used in discharge mode.

As shown in FIG. 13A, the charge and discharge mode outlet manifolds 3A and 3B may be located side by side on the opposite side of the frame 31 from the respective charge and discharge mode inlet manifolds 1 and 2. The inlet manifolds 1, 2, the channels 40c, 40d and the inlets 61, 62 are the same in FIGS. 13A, 13B as in respective FIGS. 3A, 3B, described above.

However, in FIG. 13A, the charge mode electrolyte outlet 65 is configured to provide the electrolyte out of the reaction zone in both the charge mode and the discharge mode through the exit channels 40e into the charge mode outlet manifold 3A (rather than into a common manifold). As shown in FIG. 13B, the discharge mode electrolyte outlet 66 is configured to provide the electrolyte out of the reaction zone in the charge mode through discharge mode outlet channels 44 into the discharge mode outlet manifold 3B. Thus, in FIG. 13B, channels 44 are referred to as discharge mode outlet channels rather than bypass channels 44 because channels 44 in FIG. 13B connect to a different outlet manifold 3B than channels 40e.

Similar to outlet 65 and channels 40e shown in FIG. 3A, the charge mode electrolyte outlet 65 is located in the reaction zone between the permeable and the impermeable electrodes, and channels 40e are located in the first or "charge" side of the frame 31, as shown in FIG. 13A. The discharge mode electrolyte outlet 66 is located outside the reaction zone adjacent to the surface of the first electrode facing away from the reaction zone, and channels 44 are located in the opposite second or "discharge" side of the frame 31 as shown in FIG. 13B. The plural charge mode outlet channels 40e are connected to the charge mode outlet manifold 3A formed by one set of aligned openings in the stack of frames, while one or more discharge mode outlet channels 44 are connected to a discharge mode outlet manifold 3B formed by different aligned openings in the stack of frames.

Preferably, the configuration shown in FIGS. 13A and 13B is used together with separate electrolyte reservoirs, as shown in FIG. 13C. The flow battery system 1300 shown in FIG. 13C includes the stack 103 of flow cells described above which is fluidly connected to separate dissolved chlorine poor and dissolved chlorine rich reservoirs 119A and 119B, respectively. To include flow batteries that use halogen other than chlorine, reservoir 119A may be generically referred to as "a liquefied halogen reactant poor electrolyte reservoir" which contains a volume configured to selectively accumulate the electrolyte (e.g., zinc chloride), while reservoir 119B may be referred to as "a liquefied halogen reactant rich electrolyte reservoir" which contains a volume configured to selectively accumulate the liquefied halogen reactant (e.g., the dissolved chlorine) in addition to the electrolyte. In other words, reservoir 119A contains an electrolyte (e.g., zinc chloride) which contains less liquefied halogen reactant (e.g., dissolved chlorine) than reservoir 119B.

System 1300 also includes a charge mode pump 123 fluidly connected to the charge mode inlet manifold 1, and a discharge mode pump 124 connected to the discharge mode inlet manifold 2.

The charge mode inlet manifold 1 and the charge mode outlet manifold 3A are in fluid communication with the liquefied halogen reactant poor electrolyte reservoir 119A but not with the liquefied halogen reactant rich electrolyte reservoir 119B. For example, the charge mode feed line 133 extends into the reservoir 119A and connects to manifold 1, while the outlet from manifold 3A outlets into the reservoir 119A.

The discharge mode inlet manifold 2 and the discharge mode outlet manifold 3B are in fluid communication with the liquefied halogen reactant rich electrolyte reservoir 119B but not with the liquefied halogen reactant poor electrolyte reservoir 119A. For example, the discharge mode feed line(s) 132/127 extend(s) into the reservoir 119B and connect to manifold 2, while the outlet from manifold 3B outlets into the reservoir 119B.

The flow battery system 1300 operates as follows with reference to FIG. 13C. In the charge mode, the electrolyte is provided from a charge mode electrolyte inlet 61 into the reaction zone 32 of each flow cell (see FIG. 5), and from the reaction zone 32 into both a charge mode electrolyte outlet 65 and into a discharge mode electrolyte outlet 66 illustrated in FIGS. 13A and 13B, respectively. Preferably, all of the electrolyte, such as the dissolved chlorine poor zinc chloride electrolyte used in the flow cells during the charge mode operation is provided using the charge mode pump 123 from the liquefied halogen reactant poor electrolyte reservoir 119A through the charge mode inlet conduit 1, the charge mode inlet channels 40c, and the charge mode electrolyte inlet 61 into the reaction zone 32. The electrolyte is then provided from the reaction zone through the charge mode electrolyte outlet 65, the charge mode outlet channels 40e and the charge mode outlet conduit 3A into the liquefied halogen reactant poor electrolyte reservoir 119A, and through the permeable electrode 23, the discharge mode electrolyte outlet 66, the channels 44 and the discharge mode outlet conduit 3B into the liquefied halogen reactant rich electrolyte reservoir 119B.

In the discharge mode, the electrolyte is provided from the discharge mode electrolyte inlet 62 into the reaction zone 32, and from the reaction zone 32 into the charge mode electrolyte outlet 65. Preferably, a dissolved chlorine rich zinc chloride electrolyte is used in the flow cells during the discharge mode operation. This electrolyte is provided from reservoir 119B and this electrolyte has more dissolved chlorine (e.g., 2 to 10 times more dissolved chlorine) than the dissolved chlorine poor zinc chloride electrolyte provided from reservoir 119A during charge mode. Thus, the dissolved chlorine poor reservoir 119A may be referred to as a "charge mode reservoir" and the dissolved chlorine rich reservoir 119B may be referred to as the "discharge mode reservoir".

Preferably, all electrolyte (e.g., the dissolved chlorine rich electrolyte) used in the flow cells during discharge mode operation is provided using a discharge mode pump 124 from the liquefied halogen reactant rich electrolyte reservoir 119B through the discharge mode inlet conduit 2, the discharge mode inlet channels 40*d*, the discharge mode electrolyte inlet 62 and through the porous electrode 23 into the reaction zone 32. The electrolyte is then provided from the reaction zone 32 through the charge mode electrolyte outlet 65, outlet channels 40*e* and the charge mode outlet conduit 3A into the liquefied halogen reactant poor electrolyte reservoir 119A.

Thus, in charge mode, all electrolyte (i.e., the chlorine poor electrolyte) comes into the stack 103 from reservoir 119A via manifold 1, but leaves the stack 103 through both outlet manifolds 3A and 3B into respective reservoirs 119A and 119B. The electrolyte is separated on exiting the stack such that the dissolved chlorine poor portion is provided into reservoir 119A from the reaction zone via outlet 65 and manifold 3A, while the dissolved chlorine rich portion is provided into reservoir 119B through the permeable electrode 23 via outlet 66 and manifold 3B. In contrast, in discharge mode, all of the electrolyte (e.g., the dissolved chlorine rich electrolyte) comes into the stack 103 from reservoir 119B via manifold 2 and leaves the stack 103 (as dissolved chlorine poor electrolyte) only through outlet manifold 3A into its respective reservoir 119A. The discharge outlet manifold 3B may be closed off from the stack 103 in discharge mode by closing valve 67 in manifold 3B. Valve 67 may be open during the charge mode. Therefore, as noted above, the terms "charge" and "discharge" with respect to manifolds, channels and inlets in this embodiment are provided for convenience only, because the discharge flows cross over in charge and discharge mode.

In summary, with reference to FIG. 13C, in charge mode, the charge inlet manifold 1 draws electrolyte from reservoir or tank 119A. The electrolyte enters the cell in stack 103 via inlet 61 and is channeled using flow configurations shown in FIG. 9C or 9D. The chlorine poor portion of the electrolyte flowing between the two electrodes 23, 25 in a flow cell reaction zone 32 exits the cell via outlet 65 and is routed towards the charge outlet manifold 3A. The electrolyte flowing via the charge outlet manifold 3A is low in dissolved Cl$_2$ and directed to tank 119A. The chlorine rich electrolyte flowing through the porous electrode 23 as shown in FIG. 9C or 9D exits the cell via outlet 66 and routed towards the discharge outlet manifold 3B. The electrolyte flowing via the discharge outlet manifold 3B is rich in dissolved Cl$_2$ and is directed to reservoir or tank 119B.

In discharge mode, the discharge inlet manifold 2 draws the dissolved Cl$_2$ rich electrolyte from tank 119B. This electrolyte enters the cell in stack 103 via inlet 62 and is channeled using the flow configuration shown in FIG. 10. The electrolyte exits via outlet 65 and routed towards the charge outlet manifold 3A. The electrolyte exiting the stack via the charge outlet manifold 3A is low in dissolved Cl$_2$ and is directed to tank 119A.

Therefore, with reference to FIGS. 9C, 9D and 13A, the charge mode electrolyte inlet 61 is configured to provide all of the electrolyte into the reaction zone 32 in the charge mode and the discharge mode electrolyte inlet 62 is configured to provide no electrolyte into the reaction zone in the charge mode. The discharge mode electrolyte inlet 62 is configured to provide all of the electrolyte into the reaction zone 32 in the discharge mode and the charge mode electrolyte inlet 61 is configured to provide no electrolyte into the reaction zone in the discharge mode, as shown in FIGS. 10 and 13A.

The charge mode electrolyte outlet 65 is configured to provide the liquefied halogen reactant poor portion of the electrolyte out of the reaction zone 32 to the liquefied halogen reactant poor electrolyte reservoir 119A in the charge mode, as shown in FIGS. 9C, 9D and 13A. The discharge mode electrolyte outlet 66 is configured to provide a liquefied halogen reactant rich portion of the electrolyte from the reaction zone to the liquefied halogen reactant rich electrolyte reservoir 119B in the charge mode (e.g., because valve 67 is open), as shown in FIGS. 9C, 9D and 13A The discharge mode electrolyte outlet 66 is configured to provide no electrolyte from the reaction zone 32 in the discharge mode (e.g., because the valve 67 is closed) and the charge mode electrolyte outlet 65 is configured to provide all of the electrolyte which comprises a liquefied halogen reactant poor electrolyte from the reaction zone 32 to the liquefied halogen reactant poor electrolyte reservoir 119A in the discharge mode.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A flow battery, comprising:
   a first electrode;
   a second electrode;
   a reaction zone located between the first electrode and the second electrode, wherein:
   the flow battery is configured with a first electrolyte flow configuration in charge mode and a second flow configuration in discharge mode; and
   the first electrolyte flow configuration is at least partially different from the second electrolyte flow configuration;
   a charge mode electrolyte inlet configured to provide at least a portion of the electrolyte into the reaction zone in the charge mode;
   a discharge mode electrolyte inlet configured to provide at least a portion of the electrolyte into the reaction zone in the discharge mode, wherein the discharge mode electrolyte inlet is different from the charge mode electrolyte inlet; and
   a common charge and discharge mode electrolyte outlet configured to provide the electrolyte out of the reaction zone in the charge and the discharge modes.

2. The flow battery of claim 1, wherein:
   the first electrode comprises a permeable electrode which serves as a positive electrode in the discharge mode; and the second electrode comprises an impermeable, oxidizable metal electrode which serves as a negative electrode in the discharge mode.

3. The flow battery of claim 2, wherein:
the charge mode electrolyte inlet is located in the reaction zone between the first and the second electrodes;
the discharge mode electrolyte inlet is located outside the reaction zone adjacent to a surface of the first electrode facing away from the reaction zone; and
the common electrolyte outlet is located in the reaction zone between the first and the second electrodes.

4. The flow battery of claim 3, wherein:
the charge mode electrolyte inlet is connected to plural charge mode inlet channels in a first surface of a first frame supporting at least one electrode of the cell;
the discharge mode electrolyte inlet is connected to plural discharge mode inlet channels in a second surface of the first frame opposite to the first surface of the frame; and
the common electrolyte outlet is connected to plural outlet channels in the first surface of the frame.

5. The flow battery of claim 4, wherein:
the flow battery comprises a vertical stack of horizontal flow cells electrically connected in series, and a stack of frames supporting the stack of flow cells;
each flow cell comprises one first electrode and one second electrode;
the plural charge mode inlet channels are connected to a charge mode inlet manifold formed by first aligned openings in the stack of frames;
the plural discharge mode inlet channels are connected to a discharge mode inlet manifold formed by second aligned openings in the stack of frames;
the plural outlet channels are connected to a common outlet manifold formed by third aligned openings in the stack of frames;
the stack of flow cells is located separately from a reservoir containing a first volume and a second volume;
the first electrode comprises a porous ruthenized titanium; and
the second electrode comprises titanium that is coated with zinc during the charge mode.

6. The flow battery of claim 5, further comprising:
a charge mode pump connected to the charge mode inlet manifold;
a discharge mode pump connected to the discharge mode inlet manifold;
at least one bypass channel in the second surface of the frame which is connected to the common outlet manifold;
plural conductive spacers which electrically connect the first electrode of one flow cell in the stack with the second electrode of an adjacent flow cell in the stack; and
plural flow channels located between the conductive spacers and above the first electrodes in each cell, such that the discharge mode electrolyte inlet is connected to the plural flow channels.

7. The flow battery of claim 3, wherein:
the charge mode electrolyte inlet is configured to provide all of the electrolyte into the reaction zone in the charge mode and the discharge mode electrolyte inlet is configured to provide no electrolyte into the reaction zone in the charge mode; and
the discharge mode electrolyte inlet is configured to provide all or a portion of the electrolyte into the reaction zone in the discharge mode and the charge mode electrolyte inlet is configured to provide no electrolyte or a portion of the electrolyte into the reaction zone in the discharge mode.

8. A method of operating a flow battery comprising:
flowing an electrolyte in a first flow configuration in charge mode and a second flow configuration in discharge mode, wherein the first flow configuration is at least partially different from the second flow configuration; and
wherein:
the flow battery comprises a flow cell including a first electrode, a second electrode, and a reaction zone located between the first electrode and the second electrode;
in the charge mode, the electrolyte is provided from a charge mode electrolyte inlet into the reaction zone, and from the reaction zone into a common electrolyte outlet;
in the discharge mode, at least a portion of the electrolyte is provided from a discharge mode electrolyte inlet into the reaction zone, and from the reaction zone into the common electrolyte outlet; and
the discharge mode electrolyte inlet is different from the charge mode electrolyte inlet.

9. The method of claim 8, wherein:
the first electrode comprises a permeable electrode which serves as a positive electrode in the discharge mode; and
the second electrode comprises an impermeable, oxidizable metal electrode which serves as a negative electrode in the discharge mode.

10. The method of claim 8, wherein:
the charge mode electrolyte inlet is located in the reaction zone between the first and the second electrodes;
the discharge mode electrolyte inlet is located outside the reaction zone adjacent to a surface of the first electrode facing away from the reaction zone; and
the common electrolyte outlet is located in the reaction zone between the first and the second electrodes.

11. The method of claim 10, wherein:
the first flow configuration is different from the second flow configuration in the flow cell;
in the charge mode, all of the electrolyte is provided from the charge mode electrolyte inlet into the reaction zone in the charge mode and no electrolyte is provided into the reaction zone through the first electrode from the discharge mode electrolyte inlet; and
in the discharge mode, all or a portion of the electrolyte is provided from the discharge mode electrolyte inlet through the first electrode into the reaction zone and no electrolyte or a portion of the electrolyte is provided from the charge mode electrolyte inlet into the reaction zone.

12. The method of claim 9, wherein:
the electrolyte comprises a metal halide electrolyte;
the flow cell is located in a stack of flow cells; and
the stack of flow cells is located separately from a reservoir containing a first volume and a second volume; and
further comprising pumping the metal-halide electrolyte between the reservoir and the stack of flow cells in the charge and the discharge mode using at least one pump.

13. The method of claim 12, wherein the first electrode comprises a porous ruthenized titanium, the second electrode comprises zinc plated titanium, and the stack comprises a vertical stack of horizontal flow cells connected in series.

14. The method of claim 8, wherein the flow battery operates with a higher voltaic and columbic efficiency than the same battery operating with the same first and second flow configurations.

15. The method of claim 10, wherein:
 in the charge mode:
  (a) all of the electrolyte is provided from the charge mode electrolyte inlet into the reaction zone; and
  (b) the electrolyte is provided from the reaction zone into the common electrolyte outlet through both of:
   (i) a charge mode electrolyte outlet located in the reaction zone between the first and the second electrodes; and
   (ii) the first electrode and a bypass conduit located outside the reaction zone adjacent to a surface of the first electrode facing away from the reaction zone; and
  (c) no electrolyte is provided into the reaction zone through the first electrode from the discharge mode electrolyte inlet; and
 in the discharge mode:
  (a) all of the electrolyte is provided from the discharge mode electrolyte inlet into both of:
   (i) into the reaction zone through the first electrode; and
   (ii) directly into the bypass conduit;
  (b) the electrolyte is provided from the reaction zone into the common electrolyte outlet through the charge mode electrolyte outlet; and
  (c) no electrolyte is provided from the charge mode electrolyte inlet into the reaction zone.

* * * * *

UNITED STATES PATENT AND TRADEMARK OFFICE
CERTIFICATE OF CORRECTION

PATENT NO. : 8,137,831 B1  
APPLICATION NO. : 13/169487  
DATED : March 20, 2012  
INVENTOR(S) : Gerardo Jose la O' et al.

Page 1 of 1

It is certified that error appears in the above-identified patent and that said Letters Patent is hereby corrected as shown below:

In the Specifications:

Col. 1, Line 3, Between Title and Field should read:

--This invention was made with Government support under contract DE-AR0000143 awarded by Department of Energy. The Government has certain rights in the invention.--

Signed and Sealed this
Eleventh Day of December, 2012

David J. Kappos
*Director of the United States Patent and Trademark Office*